US011792675B2

(12) United States Patent
Cao et al.

(10) Patent No.: US 11,792,675 B2
(45) Date of Patent: Oct. 17, 2023

(54) CROSS LINK INTERFERENCE DETECTION SYSTEMS AND METHODS

(71) Applicant: QUALCOMM Incorporated, San Diego, CA (US)

(72) Inventors: Yiqing Cao, Beijing (CN); Huilin Xu, Temecula, CA (US); Wanshi Chen, San Diego, CA (US); Yuwei Ren, Beijing (CN)

(73) Assignee: QUALCOMM INCORPORATED, San Diego, CA (US)

( * ) Notice: Subject to any disclaimer, the term of this patent is extended or adjusted under 35 U.S.C. 154(b) by 202 days.

(21) Appl. No.: 17/284,740

(22) PCT Filed: Oct. 15, 2019

(86) PCT No.: PCT/CN2019/111171
§ 371 (c)(1),
(2) Date: Apr. 12, 2021

(87) PCT Pub. No.: WO2020/103609
PCT Pub. Date: May 28, 2020

(65) Prior Publication Data
US 2021/0266778 A1 Aug. 26, 2021

(30) Foreign Application Priority Data
Nov. 20, 2018 (WO) ................ PCT/CN2018/116417

(51) Int. Cl.
*H04W 28/02* (2009.01)
*H04B 17/336* (2015.01)
(Continued)

(52) U.S. Cl.
CPC ...... *H04W 28/0236* (2013.01); *H04B 17/336* (2015.01); *H04L 5/0051* (2013.01); *H04W 24/10* (2013.01); *H04W 76/11* (2018.02)

(58) Field of Classification Search
CPC . H04W 28/0236; H04W 24/10; H04W 76/11; H04B 17/336; H04L 5/0051
See application file for complete search history.

(56) References Cited

U.S. PATENT DOCUMENTS 9,008,582 B2    4/2015   Barbieri et al.
9,246,660 B2 *  1/2016   Park ..................... H04L 5/0073
(Continued)

FOREIGN PATENT DOCUMENTS

CN    102014504 A    4/2011
CN    102088780 A    6/2011
(Continued)

OTHER PUBLICATIONS

CMCC: "Discussion on Remote Interference Management", 3GPP TSG RAN WG1 Meeting #89, R1-1708401, May 15-19, 2017, May 15, 2017 (May 15, 2017), Sections 3-5, 5 Pages.
CMCC: "Discussion on RS Design for RIM" 3GPP TSG RAN WG1 Meeting #94bis, R1-1811042, Oct. 12, 2018 (Oct. 12, 2018), pp. 1-14.
(Continued)

*Primary Examiner* — Deepa Belur
(74) *Attorney, Agent, or Firm* — Loza & Loza, LLP/Qualcomm Incorporated

(57) ABSTRACT

Aspects are provided allowing a first base station to distinguish between cross-link interference and remote interference caused to a second base station and to apply different mitigation mechanisms based on the type of interference. A UE receives from a second base station a reference signal based on a reference signal identifier that indicates a location of the second base station that is experiencing interference from the first base station. The UE sends to the first base station an indication of the reference signal received from the second base station. The first base station receives from the UE the indication of the reference signal from the second base station based on the reference signal identifier. The first base station applies a mitigation mechanism based on whether the reference signal identifier indicates that the (Continued)

second base station is a remote base station or a neighbor base station.

32 Claims, 16 Drawing Sheets

(51) Int. Cl.
  *H04W 76/11* (2018.01)
  *H04L 5/00* (2006.01)
  *H04W 24/10* (2009.01)

(56) References Cited

U.S. PATENT DOCUMENTS

| | | | |
|---|---|---|---|
| 9,544,115 B2 | 1/2017 | Barbieri et al. | |
| 2011/0268044 A1* | 11/2011 | Yun | H04W 24/00 370/329 |
| 2014/0364122 A1* | 12/2014 | Takeuchi | H04W 52/244 455/436 |
| 2017/0230152 A1* | 8/2017 | Byun | H04B 7/0456 |
| 2018/0242330 A1 | 8/2018 | Soriaga et al. | |
| 2021/0051662 A1* | 2/2021 | Tang | H04W 68/005 |
| 2021/0185726 A1* | 6/2021 | Xu | H04J 11/0056 |

FOREIGN PATENT DOCUMENTS

| | | | | |
|---|---|---|---|---|
| CN | 102833793 A | | 12/2012 | |
| CN | 109391995 A | * | 2/2019 | ........... H04B 17/318 |
| RU | 2516320 C2 | * | 5/2014 | ............ H04B 1/10 |
| WO | 2013029000 A1 | | 2/2013 | |
| WO | 2015026604 A1 | | 2/2015 | |
| WO | WO-2015061924 A1 | * | 5/2015 | ........... H04W 16/10 |

OTHER PUBLICATIONS

Ericsson: "On Mechanisms for Increasing Network Robustness", 3GPP TSG-RAN WG1 Meeting #95, Tdoc R1-1813167, Nov. 16, 2018(Nov. 16, 2018), pp. 1-13.
International Search Report and Written Opinion—PCT/CN2019/111171—ISA/EPO—dated Jan. 6, 2020.
International Search Report and Written Opinion—PCT/CN2018/116417—ISA/EPO—dated Aug. 21, 2019.
LG Electronics: "Discussion on Mechanism for NR RIM Support", 3GPP TSG RAN WG1 Meeting #94bis, R1-1810291, Oct. 12, 2018 (Oct. 12, 2018), pp. 1-11, Sections 1-4, section 3.
Qualcomm Incorporated: "Mechanisms for Improving Network Robustness", 3GPP Draft; R1-1813430 Mechanisms for Improving Network Robustness, 3rd Generation Partnership Project (3GPP), Mobile Competence Centre, 650, Route Des Lucioles, F-06921 Sophia-Antipolis Cedex, France, vol. RAN WG1, No. Spokane, Washington; Nov. 12, 2018-Nov. 16, 2018, (Nov. 11, 2018), XP051555469, Retrieved from Internet: URL:http://www.3gpp.org/ftp/Meetings%5F3GPP%5FSYNC/RAN1/Docs/R1%2D1813430%2Ezip [retrieved on Nov. 11, 2018], paragraph [0002]-paragraph [0005], 5 pages.
ZTE, "Consideration on Mechanism for Identifying Strong gNB Interference," R1-1810332, 3GPP TSG RAN WG1 Meeting #94bis, Oct. 12, 2018, 6 pages, sections 2-3.
Nokia, et al., "Considerations on Identifying Strong gNB Interferers", 3GPP TSG RAN WG1 Meeting #94bis, R1-1811212, 3rd Generation Partnership Project, Mobile Competence Centre, 650, Route Des Lucioles, F-06921 Sophia-Antipolis Cedex, No. Chengdu, China, Oct. 8, 2018-Oct. 12, 2018, Sep. 28, 2018, 5 Pages, Oct. 12, 2018, XP051518613.
Supplementary European Search Report—EP19886788—Search Authority—The Hague—Jun. 27, 2022.

* cited by examiner

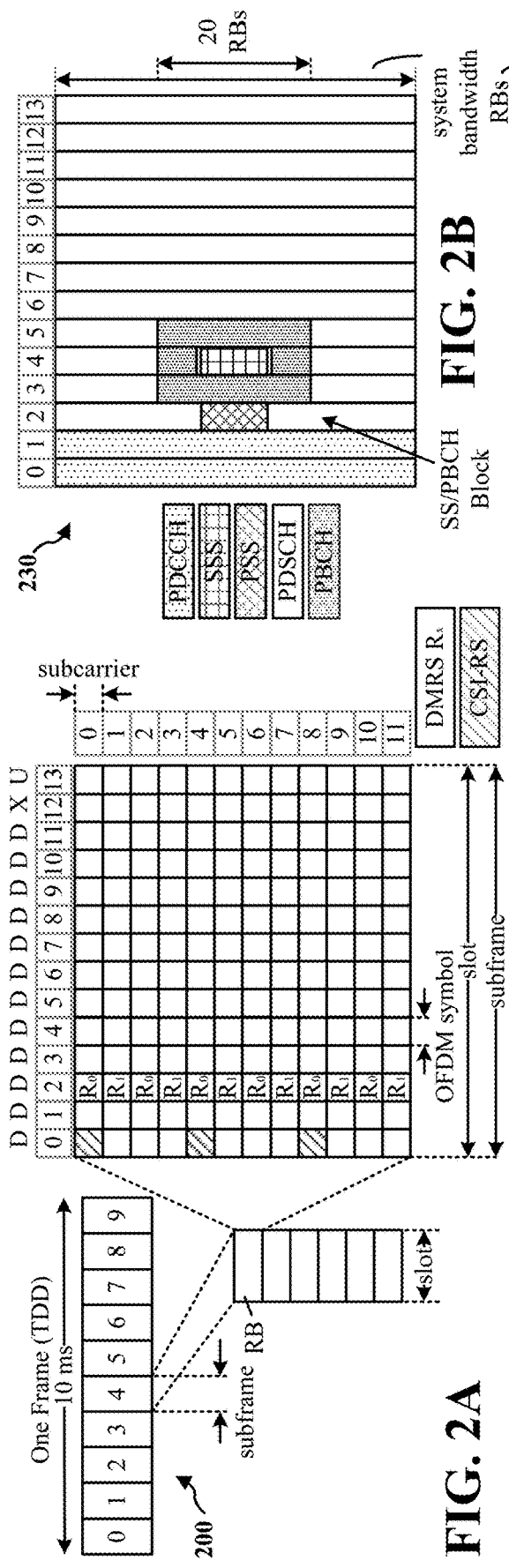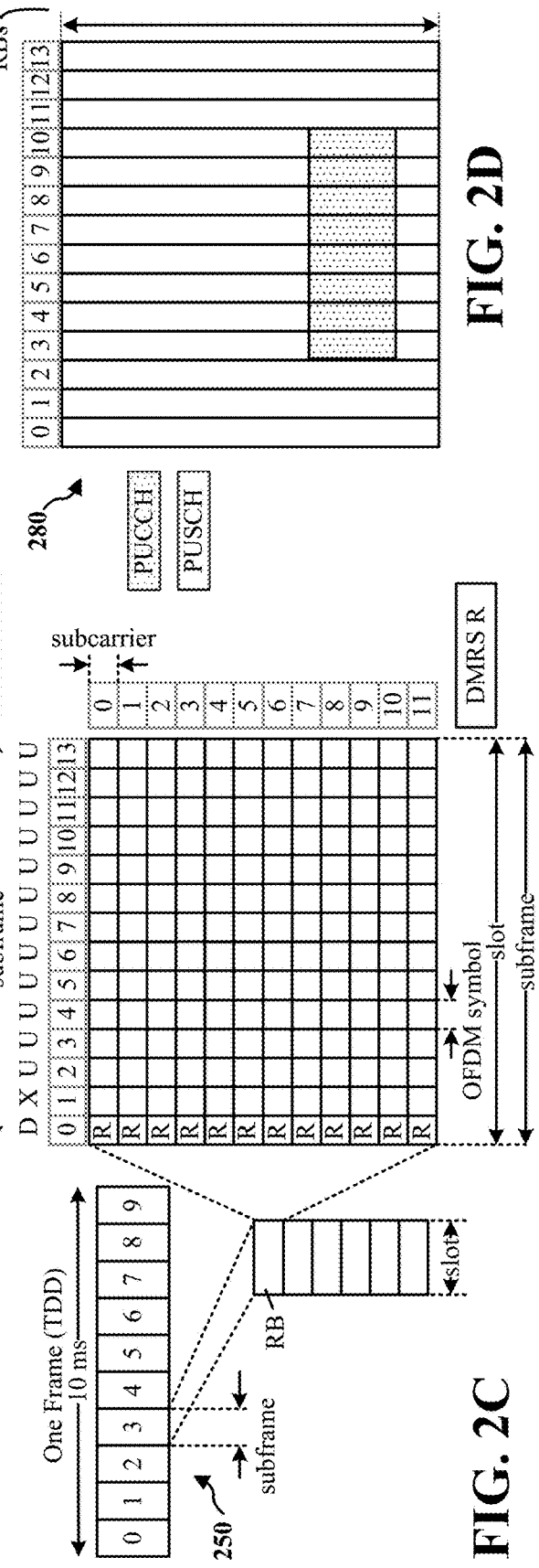

CROSS LINK INTERFERENCE DETECTION SYSTEMS AND METHODS

CROSS REFERENCE TO RELATED APPLICATION(S)

This application is a National Stage Application filed under 35 U.S.C. § 371 of PCT International Patent Application Serial No. PCT/CN2019/111171, entitled "CROSS LINK INTERFERENCE DETECTION SYSTEMS AND METHODS", and filed on Oct. 15, 2019, which claims the benefit of International Application No. PCT/CN2018/116417, entitled "CROSS LINK INTERFERENCE DETECTION SYSTEMS AND METHODS" and filed on Nov. 20, 2018, each of which is expressly incorporated by reference herein in its entirety.

BACKGROUND

Technical Field

The present disclosure relates generally to communication systems, and more particularly, to interference in communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first base station configured to receive, from a User Equipment (UE) served by the first base station, an indication of a reference signal from a second base station, the reference signal being based on a reference signal identifier that indicates a location of the second base station that is experiencing interference from the first base station. The first base station may be further configured to apply a mitigation mechanism based on whether the reference signal identifier indicates that the second base station is a remote base station or a neighbor base station.

In an aspect of the disclosure, a method, a computer-readable medium, and an apparatus are provided. The apparatus may be a UE served by a first base station, the UE configured to receive, from a second base station, a reference signal based on a reference signal identifier that indicates a location of the second base station that is experiencing interference from the first base station. The UE may be further configured to send, to the first base station, an indication of the reference signal received from the second base station.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
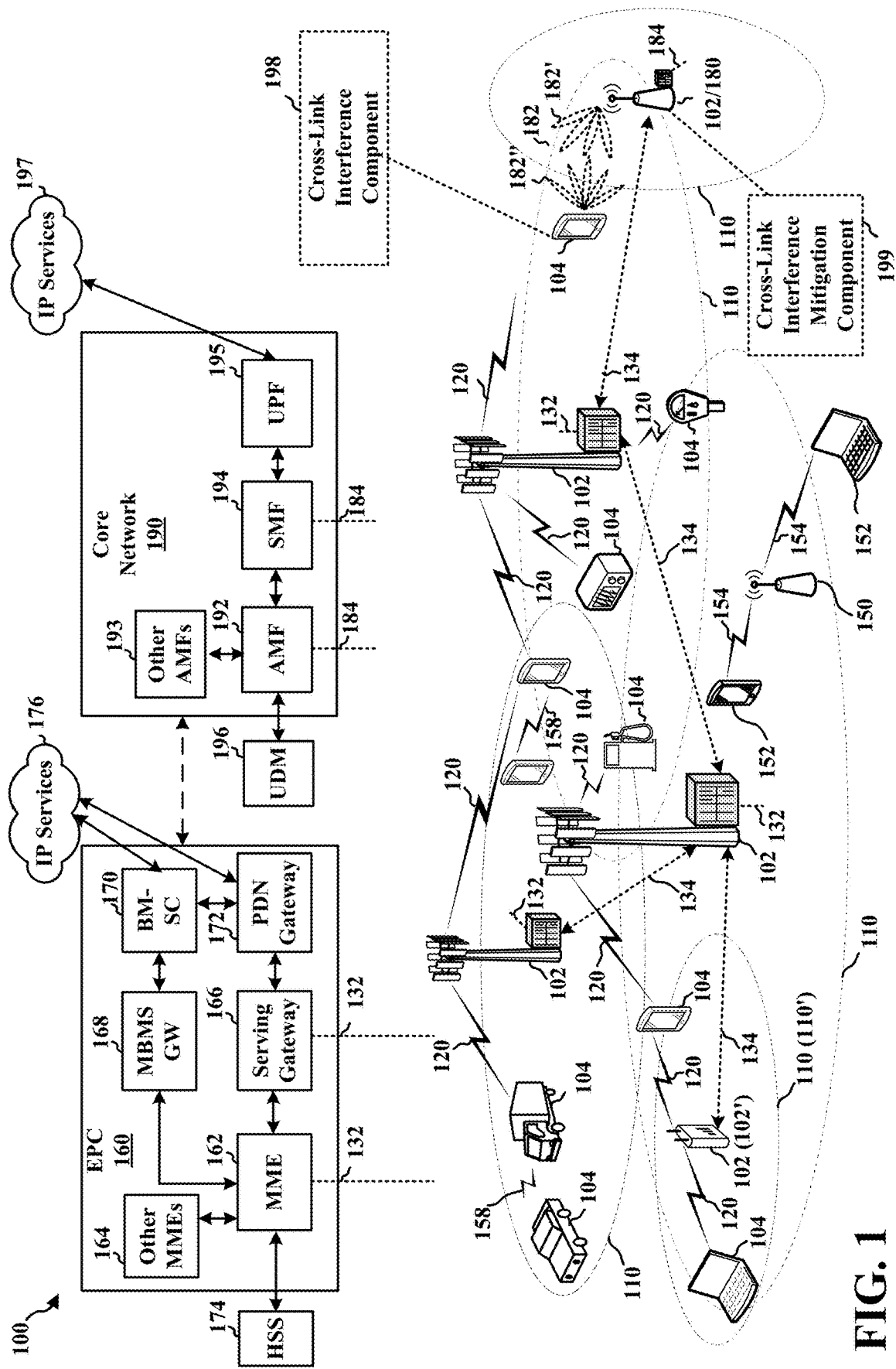
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In certain scenarios, a base station may suffer from remote interference or cross link interference from another base station. For example, a victim base station may observe remote interference from an aggressor base station located more than 100 km away as a result of atmospheric ducting. In such case, both base stations may be in a synchronized network (e.g. with a same downlink/uplink timing configuration). To address the remote interference, the base stations may perform remote interference management (RIM) with the victim base station sending a reference signal to the aggressor base station to trigger interference mitigation at the aggressor such as muting the last several downlink symbols. Alternatively, a victim base station may observe cross link interference (CLI) from an aggressor base station in a neighboring cell having a different DL/UL timing configuration. In such case, both base stations may be in an asynchronous network with different DL/UL timings. To address the CLI, the victim base station may similarly send a reference signal to the aggressor base station to trigger an interference mitigation scheme. However, due to the different DL/UL configurations, in some cases, the reference signal may be received during a downlink period of the aggressor base station, and thus may be dropped by the aggressor base station. As a result, the victim base station may send the reference signal to a UE served by the aggressor base station. When the UE detects the reference signal, the UE reports the reference signal to the aggressor base station and interference mitigation may be triggered. Due to the different timings, the interference mitigation scheme for neighbors may be different than that for remote base stations. However, during RIM, if the uplink timing of the aggressor base station is too short, the aggressor base station may also receive the reference signal from the victim base station during the aggressor base station's downlink period. Therefore, when the UE receives the reference signal to report to the aggressor base station to mitigate interference, the cause may be either neighbor interference (e.g. CLI) or remote interference (e.g. RIM).

The present disclosure provides a way to assist a base station in determining which interference mitigation scheme to perform. As presented herein, a UE and/or base station may determine a source or type of interference (e.g. remote or neighbor) from the reference signal (RS) by allowing the network or the victim base station to assign different resources for RIM RS and CLI RS. The RIM RS and CLI RS may have different reference signal identifiers (RS ID) based on the different resources, which may include sequences, frequency resources, time-slot number and scrambling code. The UE or the serving/aggressor base station may distinguish the source of interference based on the reference signal identifier and the base station may perform interference mitigation accordingly. For example, a UE that is served by a first base station and may receive, from a second base station, a reference signal based on a reference signal identifier that indicates a location of the second base station that is experiencing interference from the first base station. The UE may send, to the first base station, an indication of the reference signal received from the second base station. The base station may apply a mitigation mechanism based on whether the reference signal identifier indicates that the second base station is a remote base station or a neighbor base station.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management, paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., the base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be served by a first base station 102/180 and may include a cross-link interference component 198 configured to receive, from a second base station 102, a reference signal based on a reference signal identifier that indicates a location of the second base station 102 that is experiencing interference from the first base station 102/180. The cross-link interference component 198 may further be configured to send, to the first base station 102/180, an indication of the reference signal received from the second base station 102.

In certain aspects, the base station 102/180 may include a cross-link interference mitigation component 199 configured to receive, from the UE 104 served by the first base station 102/180, an indication of a reference signal from the second base station 102, the reference signal being based on a reference signal identifier that indicates a location of the second base station that is experiencing interference from the first base station. The cross-link interference mitigation component 199 may further be configured to apply a mitigation mechanism based on whether the reference signal identifier indicates that the second base station is a remote base station or a neighbor base station.

In an aspect, a base station such as the second base station 102 may be indicated as a remote base station when the base station, e.g., second base station, is a distance greater than 100 kilometers away from the first base station 102/180 and/or when the base station, e.g., second base station, has an RS ID that is not in a list of neighbor base station RS IDs.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
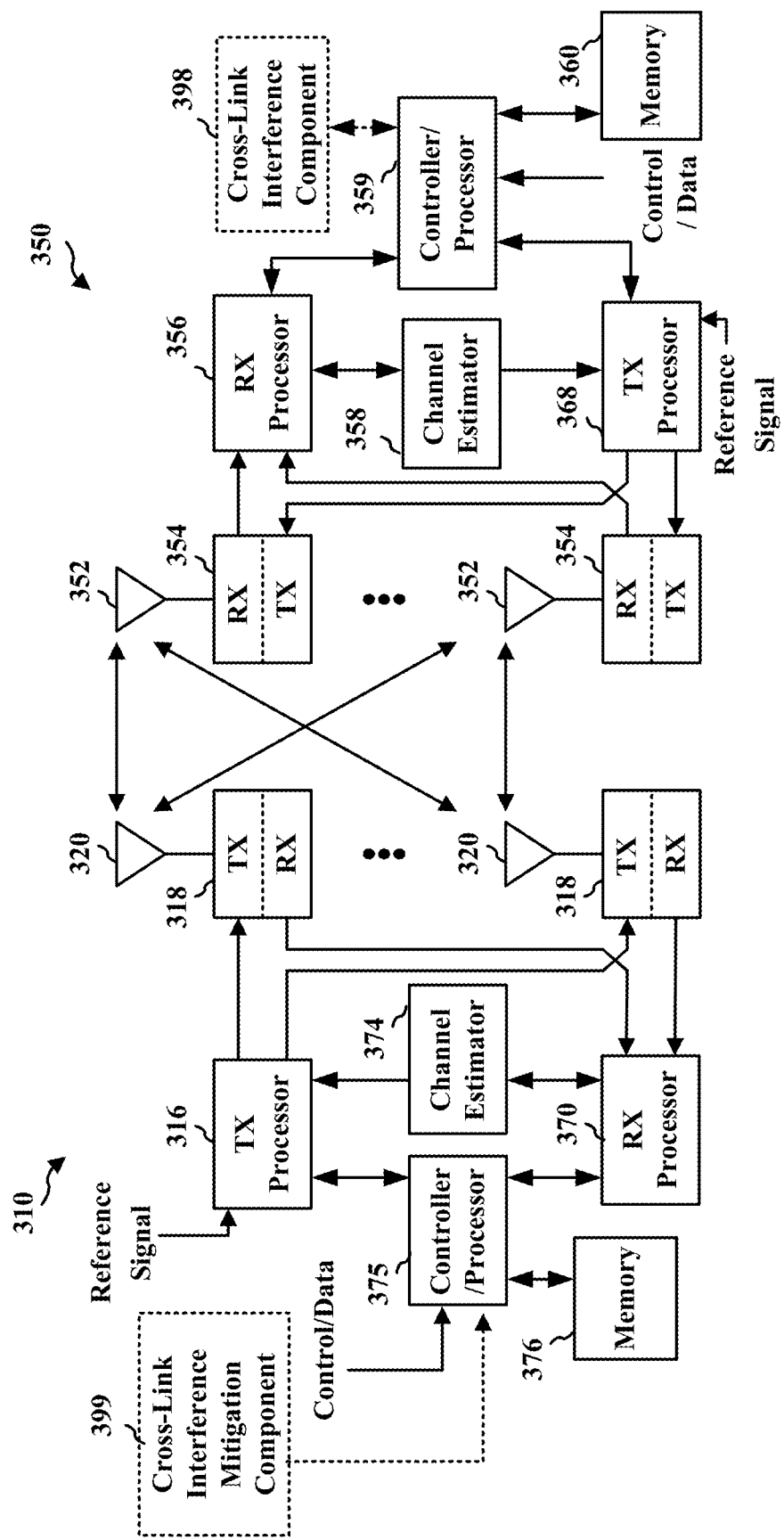
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The base station includes a cross-link interference mitigation component 399 configured to receive, from the UE 350, an indication of a reference signal from a second base station, the reference signal being based on a reference signal identifier that indicates a location of the second base station that is experiencing interference from the first base station. The cross-link interference mitigation component 399 may further be configured to apply a mitigation mechanism based on whether the reference signal identifier indicates that the second base station is a remote base station or a neighbor base station.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The UE 350 may include a cross-link interference component 398 configured to receive, from a second base station, a reference signal based on a reference signal identifier that indicates a location of the second base station that is experiencing interference from the first base station 310. The cross-link interference component 398 may further be configured to send, to the first base station 310, an indication of the reference signal received from the second base station.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1 and 398 of FIG. 3.

At least one of the TX processor 316, the RX processor 370, and the controller/processor 375 may be configured to perform aspects in connection with 199 of FIG. 1 and 399 of FIG. 3.

Figure 4:
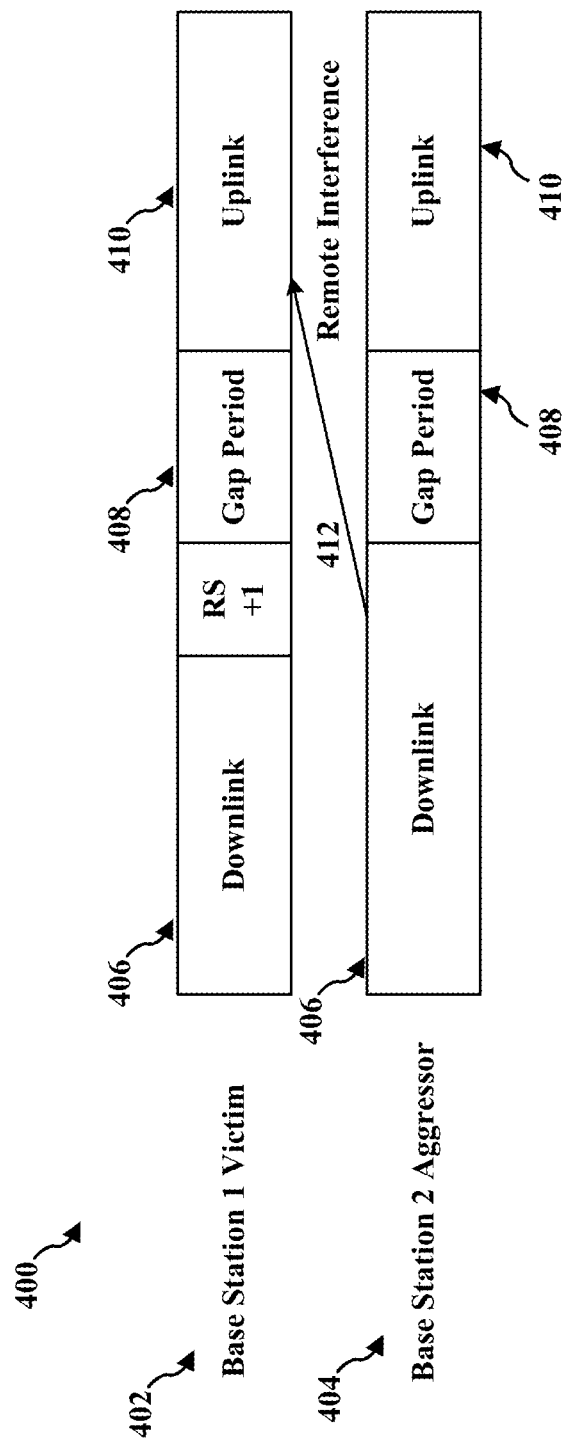
FIG. 4 is a diagram illustrating remote interference between a device that is a victim of the remote interference and an aggressor device that may cause the remote interference.

In certain scenarios, a base station may suffer from remote interference or cross link interference from another base station. For example, as illustrated in FIG. 4 discussed infra, a victim base station may observe remote interference from an aggressor base station located more than 100 km away as a result of atmospheric ducting (described below). In such case, both base stations may be in a synchronized network (e.g. with a same downlink (DL)/uplink (UL) timing configuration). To address the remote interference, the base stations may perform remote interference management (RIM). In RIM, the victim base station may send a reference signal to the aggressor base station to trigger an interference mitigation scheme at the aggressor. For example, the aggressor base station may mute the last several downlink symbols which may interfere with the victim base station's uplink timing.

Figure 5:
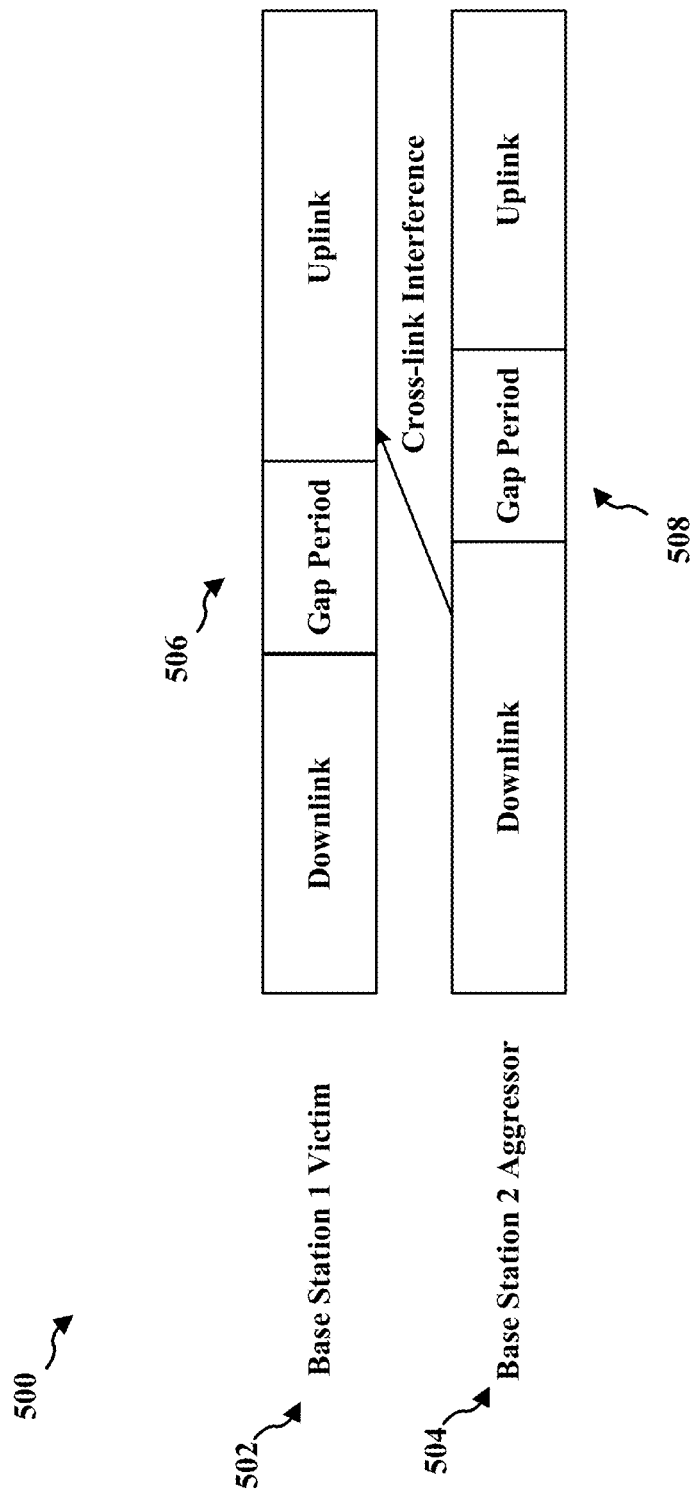
FIG. 5 is a diagram illustrating cross-link interference between a device that is a victim of the cross-link interference and an aggressor device that may cause the cross-link interference.

Alternatively, as illustrated in FIG. 5 discussed infra, a victim base station may observe cross link interference (CLI) from an aggressor base station in a neighboring cell having a different DL/UL timing configuration. In such case, both base stations may be in an asynchronous network with different DL/UL timings. To address the CLI, the victim base station may similarly send a reference signal to the aggressor base station to trigger an interference mitigation scheme. However, due to the different DL/UL configurations, in some cases, the reference signal may be received during a downlink period of the aggressor base station, and thus may be dropped by the aggressor base station. As a result, the victim base station may send the reference signal to a UE served by the aggressor base station. When the UE detects the reference signal, the UE reports the reference signal to the aggressor base station and interference mitigation may be triggered. Due to the different timings, the interference mitigation scheme for neighbors may be different than that for remote base stations.

However, during RIM, if the uplink timing of the aggressor base station is too short as illustrated below in FIG. 6, the aggressor base station may also receive the reference signal from the victim base station during the aggressor base station's downlink period. Therefore, when the UE receives the reference signal to report to the aggressor base station to mitigate interference, the cause may be either neighbor interference (e.g. CLI) or remote interference (e.g. RIM). To assist the base station in determining which interference mitigation scheme to perform, the present disclosure allows the UE and/or base station to determine the source or type of interference (e.g. remote or neighbor) from the reference signal (RS) by allowing the network or the victim base station to assign different resources for RIM RS and CLI RS. The RIM RS and CLI RS may have different reference signal identifiers (RS ID) based on the different resources, which may include sequences, frequency resources, timeslot number and scrambling code. The UE or the serving/aggressor base station may distinguish the source of interference based on the reference signal identifier (e.g. as described infra with respect to FIGS. 7-9), and the base station may perform interference mitigation accordingly.

FIG. 4 is a diagram 400 illustrating cross-link interference between a first base station and a second base station that is distant from the first base station. Such cross-link interference between two base stations that are remote from each other may be referred to as remote interference between a device that is a victim of the remote interference, i.e., base station 1 victim 402, and an aggressor device that may cause the remote interference, i.e., base station 2 aggressor 404. Remote interference may be observed from a wireless communication device, such as a base station, that is, for example, more than 100 km away from the other device. The remote interference may be due to the phenomenon of atmospheric ducting. Atmospheric ducting may occur when an atmospheric duct is formed. The atmospheric duct may be a horizontal layer in the lower atmosphere, e.g., the troposphere, in which the vertical refractive index gradients are such that radio signals are guided or ducted. The radio signals tend to follow the curvature of the Earth, and experience less attenuation in the ducts than they would if the ducts were not present. Ducting may cause the radio signals to travel over far greater distances than normal. Thus, remote, cross link interference may be caused by wireless devices some distance away, e.g., usually 100-300 km. Other phenomena that may also cause signals to propagate over longer distances than normal may also cause remote interference.

In the example in FIG. 4, the base station 1 (victim) 402 and the base station 2 (aggressor) 404 may be synchronized such that each base station transmits downlink signals at the same or at approximately the same time 406. Each base station may observe a gap period 408. The gap period 408 may allow for a break between downlink signals and uplink signals so that the downlink signals from one base station do not interfere with the uplink signals that may be received by another base station after the gap period at time 410.

As illustrated in FIG. 4, the base station 2 (aggressor) 404 transmits a downlink signal during a downlink time period 406. The downlink signal of base station 2 may travel a longer distance than the downlink signal of the base station 1 victim 402, e.g., due to atmospheric ducting. Normally, signals from base station 2 may not be received by base station 1 as a result of the gap period 408. Because of the atmospheric ducting, however, the downlink signal from the base station 2 may travel a longer distance than accounted for by the gap period. Accordingly, the downlink signal may be received by a distant base station, e.g., base station 1 (victim) 402, after the end of the gap period 408 as indicated by arrow 412. Accordingly, the downlink signal from base station 2 404 may interfere with uplink signals intended for base station 1 402.

When this problem is detected at the victim base station 402, a reference signal (RS+1) may be transmitted by base station 1 (victim) 402, e.g., near the downlink (DL) boundary to inform the aggressor base station about the interference. The RS may trigger an interference mitigation mechanism at the aggressor base station. For example, base station 2 404 may mute the last several downlink symbols, e.g., when RIM has occurred, is occurring, or is expected to occur. As other examples of interference mitigation mechanisms, the aggressor base station may perform partial muting of downlink symbols at a subset of frequencies, apply power control to at least one symbol at the end of the downlink transmission period, and/or change a transmission antenna parameter, e.g., an antenna downtilt, etc. Due to the distance between the base stations, the RS may be detected by a UE served by the aggressor base station, rather than by the aggressor base station itself. The UE may report the RS to the aggressor base station.

FIG. 5 is a diagram 500 illustrating cross-link interference (CLI) between a device that is a victim of the cross-link interference, i.e., base station 1 victim 502, and an aggressor device in a neighbor cell that may cause the cross-link interference, i.e., base station 2 aggressor 504. CLI from a neighbor base station may have a similar impact as compared to cross-link interference from a remote base station. For example, in both CLI and RIM, a downlink signal from base station 2 404, 504 may be received by base station 1 402, 502 during a time period when base station 1 402, 502 is listening for an uplink signal. As discussed above, with remote interference a downlink signal from base station 2 404 may be received by base station 1 402 during a time period when base station 1 402 is listening for an uplink signal because the signal from base station 2 404 has traveled a longer distance than normal, e.g., due to atmospheric ducting, and arrives after the gap period 408 has ended. With CLI, as illustrated in FIG. 5, a downlink signal from base station 2 504 may be received by base station 1 502 during a time period when base station 1 502 is listening for an uplink signal due to a different uplink/downlink configuration of neighboring cells. Whereas the downlink and uplink transmission periods in FIG. 4 are synchronized in time, FIG. 5 illustrates an example of asynchronous uplink and downlink transmission periods. As well, the gap periods 506, 508 may have different timings such that gap period 506 ends before the cross-link interference is received.

Similar to the example in FIG. 4, when a victim base station detects cross-link interference from a neighbor cell, the victim base station may transmit a reference signal to inform the aggressor, neighbor base station about the interference. The reference signal may trigger an interference mitigation mechanism at the aggressor, neighbor base station. Due to the asynchronous downlink/uplink communication in the example of FIG. 5, the reference signal from the victim base station may fall within a downlink portion of an aggressor, e.g., base station 2 504. Therefore, a UE communicating with the aggressor, e.g., base station 2 504, may perform RS-1 detection and then report the reference signal to the aggressor base station to trigger the aggressor's interference mitigation.

As discussed above, for RIM, a victim base station 402 may send a reference signal (RS), e.g., RS-1 near the DL boundary to trigger an aggressor's (504) interference mitigation mechanism. In order to mitigate the cross-link interference by the remote base station, base station 2 404 may mute the last several downlink symbols, e.g., when RIM has occurred, is occurring, or is expected to occur, move at least one symbol forward in an uplink transmission period, and/or request a downlink/uplink configuration from the victim base station for use at the aggressor base station.

For CLI, whether from a neighbor base station or a remote base station, a UE communicating with the aggressor, e.g., base station 2 504, may perform RS-1 detection and then trigger the aggressor's interference mitigation by reporting, e.g., reporting the RS received from the base station 1 502. While CLI from a neighbor base station may have a similar impact as compared to CLI from a remote base station, the mechanisms used for invoking interference mitigation and the interference mitigation itself may vary between a remote base station and a neighbor base station, e.g., based on a distance of an aggressor base station from the victim base station. Accordingly, it may be advantageous to determine when interference is caused by a remote base station, a neighbor base station or is a combination of both types of interference.

Figure 6:
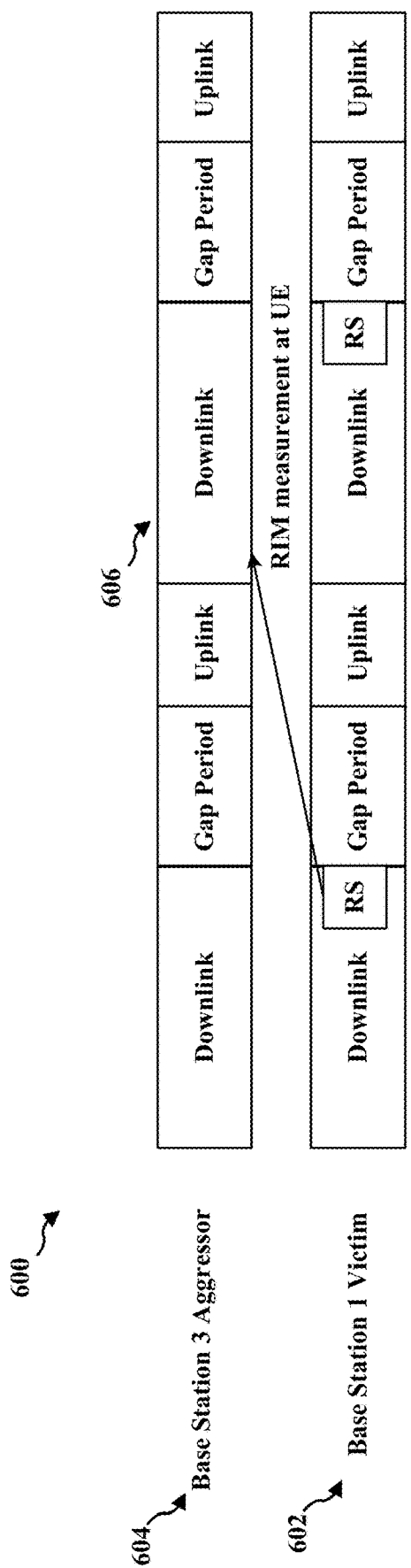
FIG. 6 is a diagram illustrating a victim of interference transmitting a reference signal to an aggressor device that may cause the interference.

FIG. 6 is a diagram 600 illustrating a victim of interference (base station 1 602) transmitting a reference signal (RS) to inform an aggressor device causing the interference (base station 3 604). For a remote aggressor base station, when the uplink time period is too short the RS from the victim base station might fall into the downlink time period of the aggressor base station. For example, an RS from base station 1 602 may be received at base station 3 604 during a downlink time period 606. The aggressor base station may not receive the RS during this downlink time period 606.

An uplink period of time that is "too short" may depend on the distance between the aggressor (base station 3 604) and the victim (base station 1 602). For example, atmospheric ducting may usually cause a propagation distance between approximately 100 and 300 km. If base station 1 602 and base station 3 604 are 150 km apart and experiencing atmospheric ducting, signals from base station 1 602 may be received by base station 3 604 after, for example, 0.5 ms, (0.5 ms=150 km propagation).

In an aspect, a UE being served by the aggressor base station may receive the reference signal and report the reference signal to the aggressor base station. The UE may determine whether the interference is CLI from a neighbor base station or interference from a remote base station, e.g. by determining a location of the victim base station and comparing the victim base station's location to the location of the aggressor base station and/or the UE. As discussed above, different interference mitigation mechanisms may be applied depending on whether the victim base station is a neighbor base station or a remote base station.

In an aspect, an RS from the victim base station may be assigned different resources such as a sequence, frequency resources, a time-slot number, and/or a scrambling code to identify the victim base station. The different resources may be indicated by an Reference Signal Identifier (RS ID). Accordingly, when an RS is transmitted with the assigned RS ID, the UE or base station receiving the RS may determine whether the RS is from a remote base station or a neighbor base station. The determination may be made by identifying a location of the victim base station based on the RS ID carried by the RS or by comparing the RS ID to a list of neighboring or remote RS IDs.

The RS ID may be assigned and/or configured for the victim base station. The aggressor base station and/or the UE served by the aggressor base station may be informed about the assigned RS ID, e.g., in a configuration from the network or in some other manner. When the aggressor base station and/or the UE receives the RS, the aggressor base station or UE may use the RS ID to determine whether the victim base station is a neighbor or is remote. The determination may involve determining a location of the victim base station from the RS ID. For example, the aggressor base station and/or UE may consult a look up table to determine a distance to the victim base station based on the sequence, frequency, slot number, and/or scrambling code used to transmit the RS. As another example, the aggressor base station may check a list of RS IDs corresponding to neighboring base stations and determine that the victim is a remote base station if it is not in the list.

In one example, different RS resources may be assigned for interference from a remote base station and CLI from a neighbor base station, such as different sequences, frequency resources, time-slot number and scrambling code. Thus, the resources used to transmit the RS may inform the aggressor base station and/or the UE served by the aggressor base station about the type of interference. For example, a UE or the serving aggressor base station may distinguish an interference source based on different resources, such as sequences, frequency resources, time-slot number, and scrambling code. The UE or aggressor base station may then determine the distance from the victim base station based on the different resources. The victim base station may select the sequences, frequency resources, time-slot number, and/or a scrambling code based on the RS ID and thereby indicate the RS ID by transmitting the reference signal using the RS resources. For example, RS resources corresponding to a same RS ID may be the same while RS resources corresponding to different RS IDs may be different. Accordingly, the UE or aggressor base station may distinguish between remote interference or neighbor CLI based on the distance from the victim base station and perform an interference mitigation scheme tailored to the type of interference, e.g., RIM or CLI.

Figure 7:
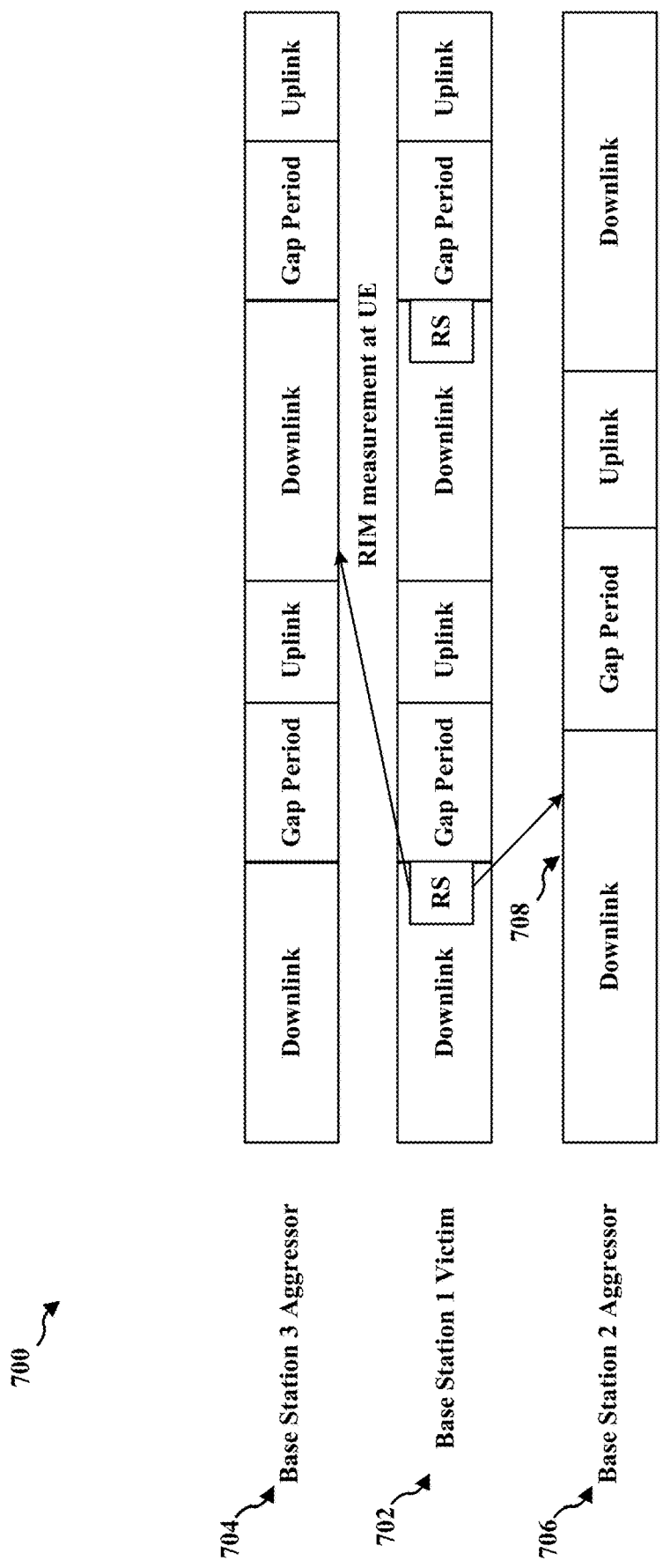
FIG. 7 is a diagram illustrating a victim of interference transmitting a reference signal to aggressor devices that may cause the interference.

FIG. 7 is a diagram 700 illustrating a victim base station that may experience interference transmitting a reference signal to aggressor base stations 704, 706 that may have caused the interference. The diagram 700 is similar to the diagram 600 of FIG. 6, but includes a second aggressor base station, e.g., base station 2 706. Base station 2 706 may be closer in distance to base station 1 702. Accordingly, base station 2 706 may receive an RS from base station 1 702 before base station 3 704. Additionally, base station 2 706 may have a different uplink/downlink configuration than the other base stations. Accordingly, the RS may be transmitted to base station 2 during the downlink period 708. Since the base station 2 706 may therefore not receive the RS, a UE being served by the base station 2 may receive the RS and report the RS to the base station 2. After determining whether the base station 1 702 is a remote base station or a neighbor base station (e.g. as discussed infra with respect to FIGS. 8 and 9), the base station 2 706 may apply a mitigation mechanism to reduce interference as described above.

Figure 8:
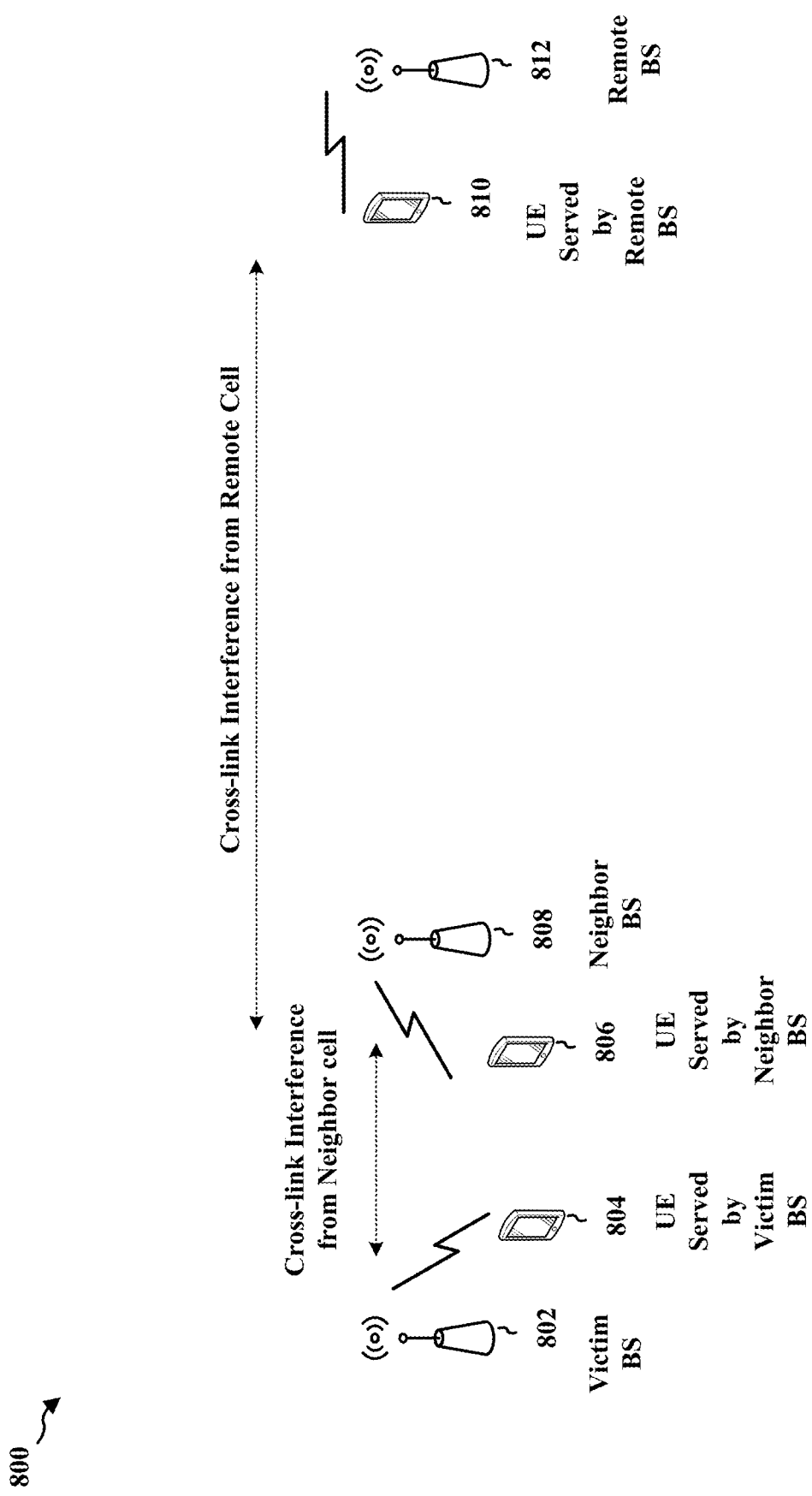
FIG. 8 is a signaling diagram illustrating a victim base station that may experience interference due to downlink transmissions from a neighbor base station and/or a remote base station.

FIG. 8 is a signaling diagram 800 illustrating a victim base station 802 that may experience interference due to downlink transmissions from a neighbor base station 808 and/or a remote base station 812. The diagram further illustrates a UE 804 served by the victim base station 802, a UE 806 served by the neighbor base station 808, and a UE 810 served by the remote base station 812.

As illustrated in FIG. 8, a neighbor base station 808 may cause cross-link interference with a neighboring cell that may include the victim base station 802 and the UE 804 served by the victim base station 802. Similarly, a remote base station 812 may cause remote cross-link interference with the cell that may include the victim base station 802 and the UE 804 served by the victim base station 802. As discussed above, mitigation mechanisms for cross-link interference from a neighbor base station, e.g., 808, and a remote base station, e.g., 812, may be different. Accordingly, when interference is occurring, it may be useful for the victim base station 802 to send a reference signal that enables a receiving base station, e.g., 808/812, to determine the appropriate mitigation mechanism to apply.

Figure 9:
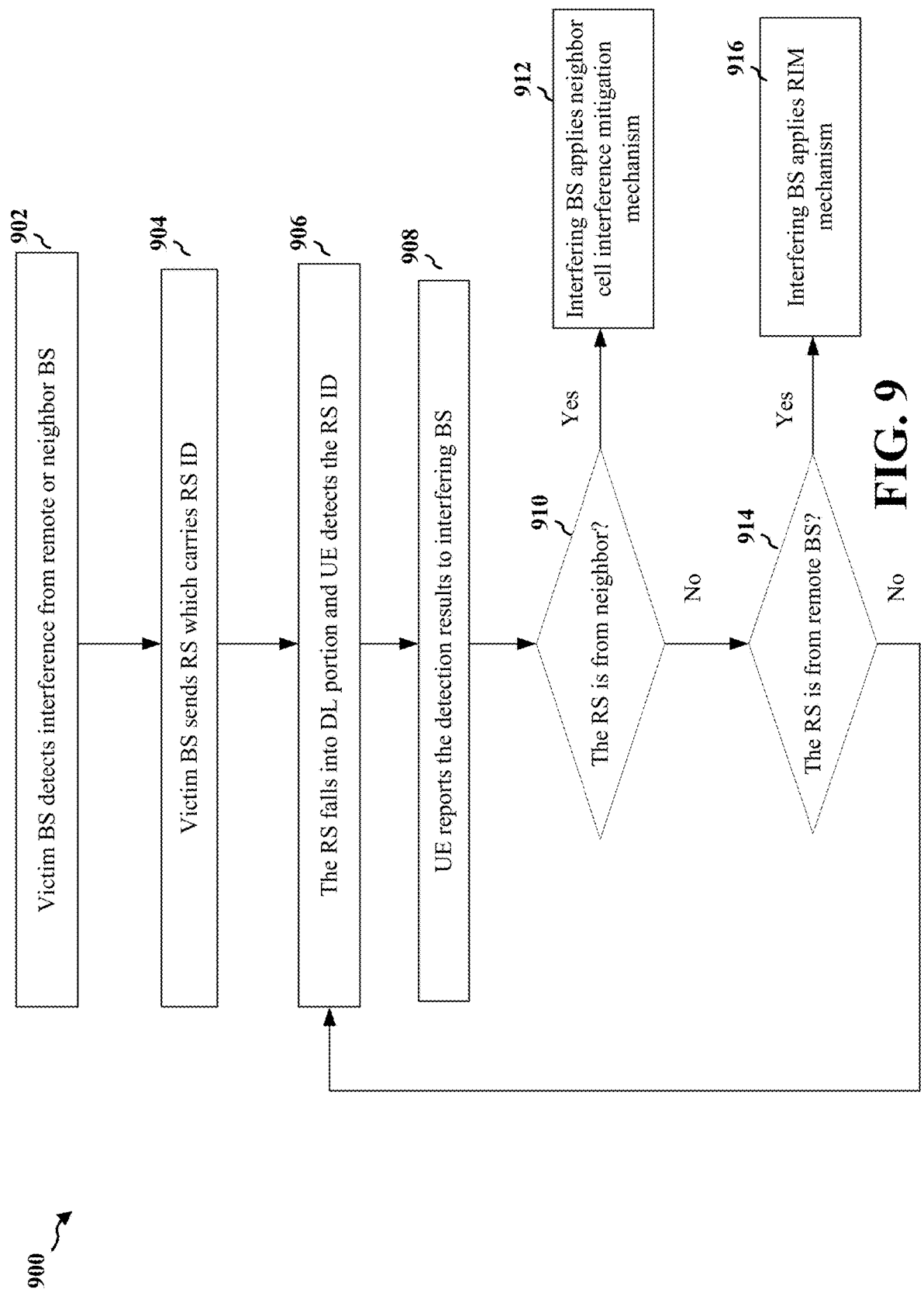
FIG. 9 is a flowchart of a method of wireless communication in which a victim base station may transmit a reference signal using a reference signal identifier (RS ID) that enables an interfering base station to determine and apply an appropriate mitigation mechanism.

FIG. 9 is a flowchart 900 of a method of wireless communication in which the victim base station may transmit an RS using an RS ID that enables an interfering base station to determine and apply an appropriate mitigation mechanism. At 902, a victim base station, BS1, may detect cross-link interference. The base station (BS1) may not know the source of the interference. Thus, the interference may be cross-link interference from a remote base station or a neighbor base station.

At 904, the victim base station (BS1) may send an RS. As described herein, the RS may carry an RS ID differentiated by frequency, sequence, slot number and/or scrambling code. Accordingly, the RS may be capable of being identified by a device receiving the RS, e.g., a UE served by an aggressor base station and/or an aggressor base station. The RS ID may correspond to a base station ID of the victim BS that transmitted the RS. However, the RS ID need not correspond to the base station ID of the base station that transmitted the RS. For example, the resources used to transmit the RS may identify the RS in another manner. The RS ID may identify a particular base station that transmitted the RS. However, in some aspects, the RS ID may only identify a location of the victim base station without actually identifying a particular device, e.g., the victim base station.

In one example, the RS ID may identify a location of the victim base station using the time domain. For example, the victim base station may be configured to transmit the RS in a particular slot. The time at which the RS signal is received may be used by the receiving UE and/or aggressor base station to calculate the distance between the victim base station and the aggressor base station. For example, the RS may occupy at least one symbol near a boundary of a downlink transmission, e.g., a last symbol, two last symbols, or several of the last symbols of a downlink period. The time position for the RS may be configured (e.g. by the network) and known by the aggressor base station and the victim base station. A slot number may carry the RS ID, e.g., a victim base station may be configured to use a particular slot number to transmit the RS when interference is detected. The aggressor base station and/or a UE served by the aggressor base station may be aware of the configuration (e.g. from the network or the victim base station) so that the slot number on which the RS is received may be used to identify the victim base station, a location of the victim base station and/or a distance to the victim base station.

In another example, the RS ID may be indicated using a frequency domain. An available frequency band may be divided into sub-bands. The victim base station may be configured to use a particular sub-band to transmit the RS when cross-link interference is detected. Thus, different sub-bands may be used to carry RS IDs for different victim base stations. For example, each base station in a set of base stations may be configured to use a different frequency range within the available frequency range. The aggressor base station and/or a UE served by the aggressor base station may be aware of the configuration (e.g. from the network or the victim base station) so that the frequency band on which the RS is received may be used to identify the victim base station, a location of the victim base station and/or a distance to the victim base station.

In another example, a sequence may be used to carry the RS ID. For example, a gold sequence, Zadoff Chu sequence or other sequence with good cross-correlation properties may be used to indicate the location of the victim base station sending the RS. Accordingly, when several different sequences, e.g., 8 sequences or another number, are used to carry the RS ID, the sequence of a particular RS may identify the RS and thus provide a form of RS ID. The victim base station may be configured (e.g. by the network) to use a particular sequence for the RS that is transmitted when cross-link interference is detected. The aggressor base station and/or a UE served by the aggressor base station may be aware of the configuration (e.g. from the network or the victim base station) so that the sequence used for the RS may be used to identify the victim base station, a location of the victim base station and/or a distance to the victim base station.

In another example, a scrambling code may be used to provide RS ID. The victim base station may be configured (e.g. by the network) to use a particular scrambling code for the RS that is transmitted when cross-link interference is detected. The aggressor base station and/or a UE served by the aggressor base station may be aware of the configuration (e.g. from the network or the victim base station) so that the scrambling code of the RS may be used to identify the victim base station, a location of the victim base station and/or a distance to the victim base station. The scrambling code may be a cell-specific sequence, and/or a cell-specific time/frequency pattern.

The RS ID may be based on any combination of a sequence, frequency resource, time resource and/or scrambling code. The RS ID may be cell specific, e.g., each cell has a corresponding RS ID. In another example, multiple cells may be arranged in a cluster, and the RS ID may be reused per cluster such that there are no conflicts within a cluster (e.g. the cluster is large enough so that no conflicting RS IDs may be expected). The RS ID may also include two parts, e.g., a cluster ID and a cell ID. In one example, the cluster ID may be unique. In another example, the cluster ID may be reused for clusters with a large geometry. When the cluster ID is reused, it may generally be reused over a large area such that the distance between two groups of cells having the same cluster ID may be large, e.g., greater than the distance of the potential atmospheric ducting. For example, the distances may be greater than 300 km, perhaps an order of magnitude greater than the distance of the potential atmospheric ducting.

At 906 in FIG. 9, a UE may detect the RS ID and decide the interference is from a neighbor or remote interference, e.g., because the RS arrives within a downlink period for the aggressor base station. In an aspect, a UE detection window for the RS ID may be configured by the serving base station or network. For example, when the UE detection window is configured by the network, the AMF or operations, administration and maintenance (OAM) may configure the UE detection window. In an aspect, the RS ID may be carried by one or more of frequency, time, and sequence.

At 908, the UE reports the RS ID to its serving base station (e.g., the aggressor base station) and at 910 and 914, the aggressor BS may determine whether the interference is caused by a neighbor base station or a remote base station. The aggressor BS may determine if the interference is remote interference or neighbor interference using the RS ID. Thus, the UE may merely pass the RS information to the aggressor base station without making any determinations about the location of the victim base station. In another example, the UE may determine whether the victim base station is a neighbor or remote and may indicate the type of interference to the aggressor base station when reporting the RS. For example, the aggressor BS and/or UE may be configured with knowledge of the RS ID pool used by remote devices and the RS ID pool used by neighbor devices. Then the UE may decide the RS is from a remote device or a neighbor device based on which RS ID pool the RS ID is in.

At 912, when the RS is determined to be from a neighbor cell, the aggressor base station may apply an interference mitigation mechanism for CLI to the neighbor base station, e.g. by performing any of the following: using the same downlink/uplink configuration as the neighbor (victim) base station, muting the last several downlink symbols, e.g., when CLI has occurred, is occurring, or is expected to occur, moving at least one symbol forward in an uplink transmission period, and/or requesting a downlink/uplink configuration from the neighbor base station for use at the aggressor base station. For example, an alignment of transmission boundaries between the base stations may be performed, e.g., a network device may set the transmission boundary to eliminate the interference.

At 916, when the RS is from a distant device, e.g., indicating remote cross-link interference, the aggressor base station may apply an interference mitigation mechanism for RIM which may include any of the following: muting the last several downlink symbols, e.g., when RIM has occurred, is occurring, or is expected to occur, performing partial muting at a subset of frequencies, applying power control to at least one symbol at the end of the downlink transmission period, and/or changing a transmission antenna parameter, e.g., an antenna downtilt, etc. The symbols to be muted may be determined based on when the RS is received, e.g., as detected by the UE at 906.

The RS ID used to signal the cross-link interference and transmitted by the victim base station may be assigned by the network (e.g., the victim base station, the AMF, or the OAM), and the serving (aggressor) base station may be aware of the RS ID whether it is from a remote or neighbor base station. For instance, the network may configure the RS resource associated with the RS ID based on resource pool partitioning. With resource pool partitioning, one resource pool may be used over a large area (e.g. including the victim base station and the aggressor base station). Thus, the RS ID used by the victim base station may be determined by the aggressor base station based on the resources configured within the resource pool.

Figure 10:
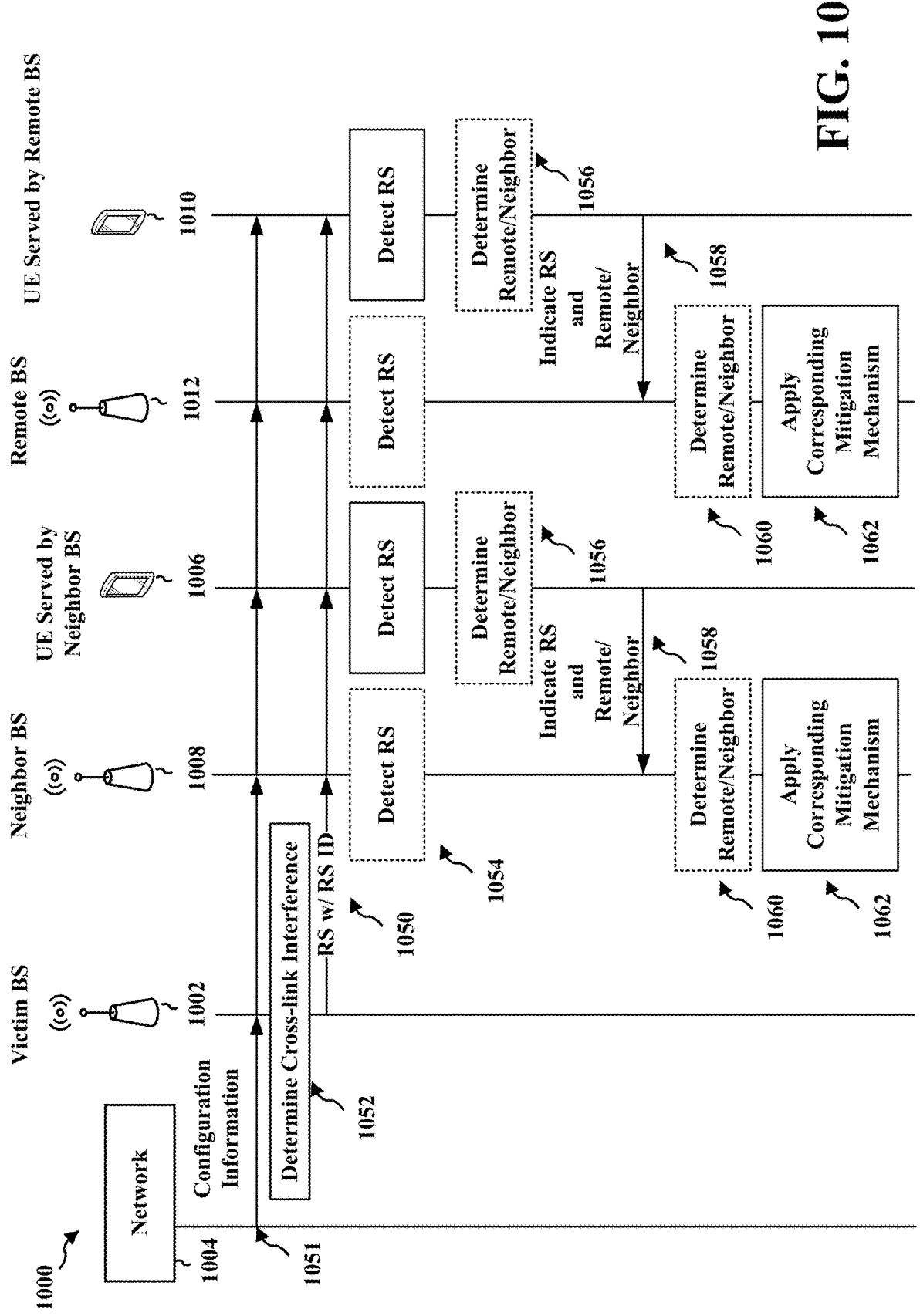
FIG. 10 is a call flow diagram illustrating a victim base station that may transmit reference signals with a reference signal ID that may be received by an interfering base station or a UE served by the interfering base station.

FIG. 10 is a call flow diagram 1000 illustrating a victim base station 1002 that may transmit reference signals 1050 with a reference signal ID (RS ID) that may be received by an interfering base station (e.g., a neighbor base station 1008 or a remote base station 1012) or a UE served by the interfering base station, e.g., a UE 1006 served by the neighbor base station 1008 or a UE 1010 served by the remote base station 1012.

A network 1004 may provide configuration information 1051 to the victim base station 1002 regarding the RS ID which includes the resources indicating the location of the victim base station. The resources may include a sequence, frequency resource, time resource, and/or scrambling code identifying the location of the victim base station 1002, e.g., as described in connection with 904 of FIG. 9. The network 1004 or victim base station 1002 may send the configuration information 1051 to the neighbor base station 1008, the remote base station 1012, the UE 1006 served by the neighbor base station 1008, or the UE 1010 served by the remote base station 1012.

The victim base station 1002 may determine that cross-link interference has occurred (or is occurring) at block 1052 and transmit a reference signal 1050 using an RS ID, as described in connection with FIGS. 8 and 902 and 904 of FIG. 9. One or more of the neighbor base station 1008, remote base station 1012, UE 1006 served by neighbor base station 1008, or UE 1010 served by remote base station 1012 may detect the RS 1054 at block(s) 1054.

When the UE 1006 and/or UE 1010 detects the RS, as described in connection with 906 of FIG. 9, the UE(s) may determine if the inference is caused by a neighbor base station 1008 or a remote base station 1012 at block(s) 1056 and send an indication 1058 to its corresponding base station, e.g., neighbor base station 1008 and/or remote base station 1012, if the interference is neighbor interference or remote interference as described in connection with 908 of FIG. 9.

Alternately, the UE 1006/1010 may merely report the RS to the corresponding serving base station without making a determination about whether the RS is from a neighbor base station or a remote base station. The neighbor base station 1008 and/or remote base station 1012 may then determine if the interference is caused by a neighbor base station 1008 or a remote base station 1012 at block(s) 1060, e.g., as described in connection with 910 and 914 of FIG. 9.

The neighbor base station 1008 and/or remote base station 1012 may then apply the appropriate or corresponding mitigation mechanism at block(s) 1062 based on the type of interference, e.g., as described in connection with 912 and 916 of FIG. 9.

Figure 11:
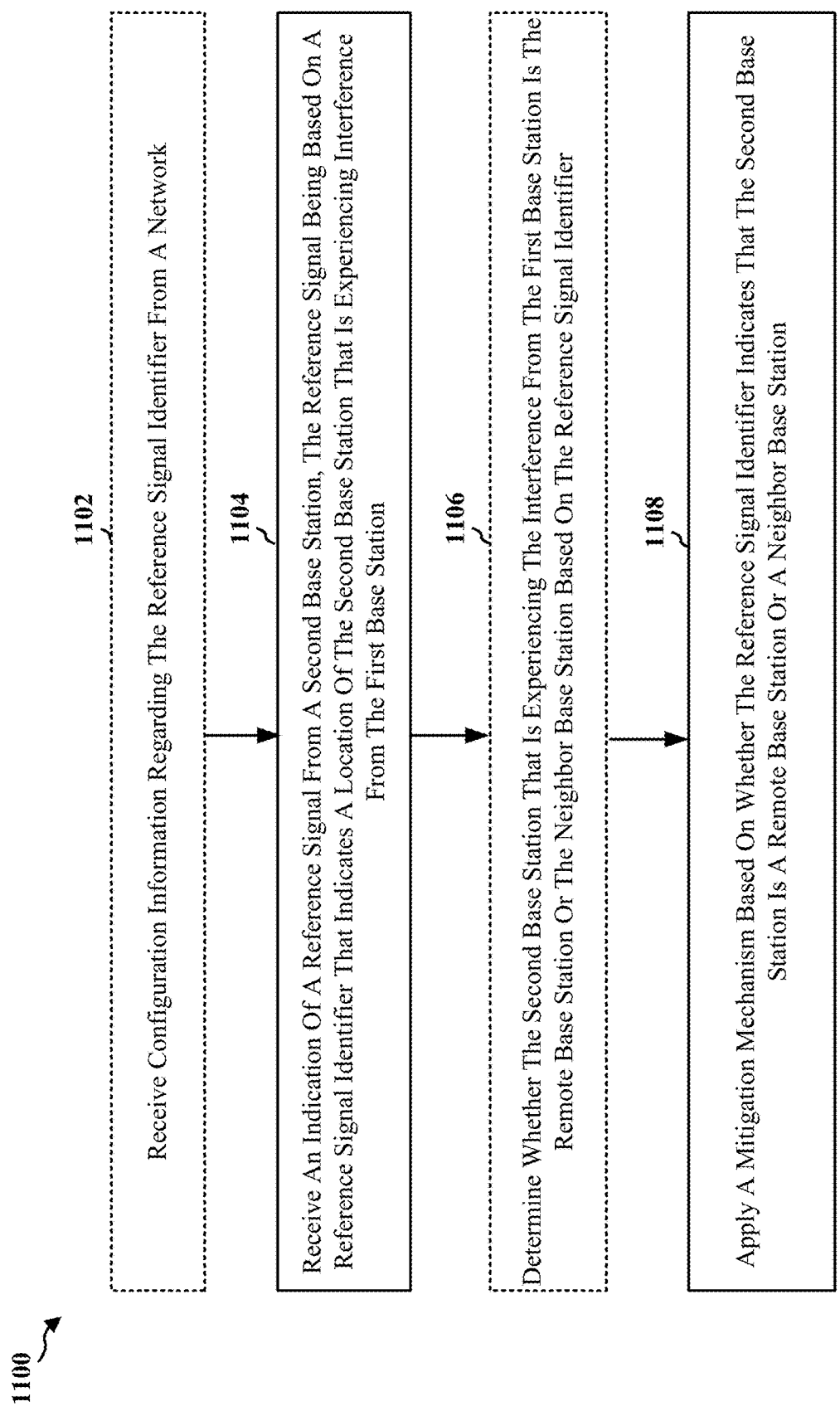
FIG. 11 is a flowchart of a method of wireless communication at a first base station.

FIG. 11 is a flowchart 1100 of a method of wireless communication. The method may be performed by a base station (e.g., base station 102/180, 310, 808, 812, 1008, 1012, 1550; the apparatus 1202/1202'; the processing system 1314, which may include the memory 376 and which may be the entire base station 310 or a component of the base station 310, such as the TX processor 316, the RX processor 370, and/or the controller/processor 375). The base station may be an aggressor base station or an interfering base station and is referred to herein as the first base station. Optional aspects are illustrated in dashed lines. The method allows the first base station to be able to distinguish between different types of interference, such as cross-link interference caused to a neighbor base station or to a remote base station, and apply different mitigation mechanisms based on the type of interference. The neighbor base station or remote base station may be a victim base station and is referred to herein as the second base station.

At 1102, the first base station receives configuration information regarding the reference signal identifier from a network, wherein the configuration information includes resources indicating the location of the second base station. For example, 1102 may be performed by the configuration component 1208 of the apparatus 1202 in FIG. 12. In an aspect, the configuration information may indicate a sequence that identifies the location of the second base station. The configuration information may indicate a frequency resource that identifies the location of the second base station. The configuration information may indicate a time resource that identifies the location of the second base station. The configuration information may indicate a scrambling code that identifies the location of the second base station. For example, referring to FIG. 10, a network 1004 may provide configuration information 1051 to the victim base station 1002 regarding the RS ID which includes the resources indicating the location of the victim base station. The resources may include a sequence, frequency resource, time resource, and/or scrambling code identifying the location of the victim base station 1002, e.g., as described in connection with 904 of FIG. 9. The network 1004 or victim base station 1002 may send the configuration information 1051 to the neighbor base station 1008, the remote base station 1012, the UE 1006 served by the neighbor base station 1008, or the UE 1010 served by the remote base station 1012.

At 1104, the first base station receives from a UE (e.g., 104, 350, 806, 810, 1006, 1010, 1250) served by the first base station, an indication of a reference signal from a second base station (e.g., base station 102/180, 310, 802, 1002, 1551). For example, 1104 may be performed by the reference signal component 1206 of the apparatus 1202 in FIG. 12. The reference signal may be based on a reference signal identifier that indicates a location of the second base station that is experiencing interference from the first base station. In an aspect, the indication from the UE may indicate whether the second base station is a remote base station or a neighbor base station. For example, referring to FIG. 10, when the UE 1006 and/or UE 1010 detects the RS from the victim base station 1002, as described in connection with 906 of FIG. 9, the UE(s) may determine if the inference is caused by a neighbor base station 1008 or a remote base station 1012 at block(s) 1056 and send an indication 1058 to its corresponding base station, e.g., neighbor base station 1008 and/or remote base station 1012, if the interference is neighbor interference or remote interference as described in connection with 908 of FIG. 9. Alternately, the UE 1006/1010 may merely report the RS to the corresponding serving base station without making a determination about whether the RS is from a neighbor base station or a remote base station. The reference signal includes an RS ID that indicates the location of the victim base station, e.g., as described in connection with 902 and 904 of FIG. 9.

In an aspect, the reference signal may be received in a set of symbols at a time position configured by a network. The reference signal identifier may be based on any combination of a frequency resource, a sequence resource, a slot number, or a scrambling code for receiving the reference signal. For example, referring to FIG. 9, at 904, the victim base station (BS1) may send an RS carrying an RS ID differentiated by frequency, sequence, slot number and/or scrambling code. In one example, the RS ID may identify a location of the victim base station using the time domain. For example, the victim base station may be configured to transmit the RS in a particular slot. The time position for the RS may be configured (e.g. by the network) and known by the aggressor base station and the victim base station. A slot number may carry the RS ID, e.g., a victim base station may be configured to use a particular slot number to transmit the RS when interference is detected. In another example, the RS ID may be indicated using a frequency domain. An available frequency band may be divided into sub-bands. The victim base station may be configured to use a particular sub-band to transmit the RS when cross-link interference is detected. Thus, different sub-bands may be used to carry RS IDs for different victim base stations. In another example, a sequence may be used to carry the RS ID. For example, a gold sequence, Zadoff Chu sequence or other sequence with good cross-correlation properties may be used to indicate the location of the victim base station sending the RS. Accordingly, when several different sequences, e.g., 8 sequences or another number, are used to carry the RS ID, the sequence of a particular RS may identify the RS and thus provide a form of RS ID. In another example, a scrambling code may be used to provide RS ID. The victim base station may be configured (e.g. by the network) to use a particular scrambling code for the RS that is transmitted when cross-link interference is detected.

The reference signal identifier may be cell specific. The reference signal identifier may be unique within a cluster of cells, and the reference signal identifier may include a cluster identifier and a cell identifier for the second base station. For example, referring to FIG. 9, at 904, the RS ID may be cell specific, e.g., each cell has a corresponding RS ID. In another example, multiple cells may be arranged in a cluster, and the RS ID may be reused per cluster such that there are no conflicts within a cluster (e.g. the cluster is large enough so that no conflicting RS IDs may be expected). The RS ID may also include two parts, e.g., a cluster ID and a cell ID. In one example, the cluster ID may be unique. In another example, the cluster ID may be reused for clusters with a large geometry. When the cluster ID is reused, it may generally be reused over a large area such that the distance between two groups of cells having the same cluster ID may be large, e.g., greater than the distance of the potential atmospheric ducting.

At 1106, the first base station determines whether the second base station that is experiencing the interference from the first base station is a remote base station or a neighbor base station based on the reference signal identifier. For example, 1106 may be performed by the determination component 1210 of the apparatus 1202 in FIG. 12. The second base station may be the remote base station when the second base station is a distance greater than 100 kilometers away from the first base station, and/or when the reference signal identifier is not in a list of neighbor base station reference signal identifiers. For example, referring to FIG. 10, the neighbor base station 1008 and/or remote base station 1012 may then determine if the interference with the victim base station 1002 is caused by the neighbor base station 1008 or the remote base station 1012 at block(s) 1060, e.g., as described in connection with 910 and 914 of FIG. 9. The aggressor BS may determine if the interference is remote interference or neighbor interference using the RS ID. For example, the aggressor base station may consult a look up table to determine a distance to the victim base station based on the sequence, frequency, slot number, and/or scrambling code used to transmit the RS. As another example, the aggressor base station may check a list of RS IDs corresponding to neighboring base stations and determine that the victim is a remote base station if it is not in the list.

At 1108, the first base station applies a mitigation mechanism based on whether the reference signal identifier indicates that the second base station is a remote base station or a neighbor base station. For example, 1108 may be performed by the mitigation component 1212 of the apparatus 1202 in FIG. 12. For instance, referring to FIG. 10, the neighbor base station 1008 and/or remote base station 1012 may apply the appropriate or corresponding mitigation mechanism at block(s) 1062 based on the type of interference, e.g., as described in connection with 912 and 916 of FIG. 9. For example, in an aspect, the first base station may apply a remote cell cross link interference mechanism when the reference signal identifier indicates that the second base station is the remote base station, e.g., as described in connection with 916 in FIG. 9. In an aspect, the remote cell cross link interference mechanism includes at least one of muting at least one symbol at an end of a downlink transmission period, performing partial muting at a subset of frequencies, applying power control to at least one symbol at the end of the downlink transmission period, or changing a transmission antenna parameter. The first base station may apply a neighbor cell cross link interference mitigation mechanism when the reference signal identifier indicates that the second base station is a neighbor base station, e.g., as described in connection with 912 in FIG. 9. The neighbor cell cross link interference mitigation mechanism includes at least one of muting at least one symbol at an end of a downlink transmission period; moving at least one symbol forward in an uplink transmission period, or requesting a downlink/uplink configuration from the second base station for use at the first base station.

Figure 12:
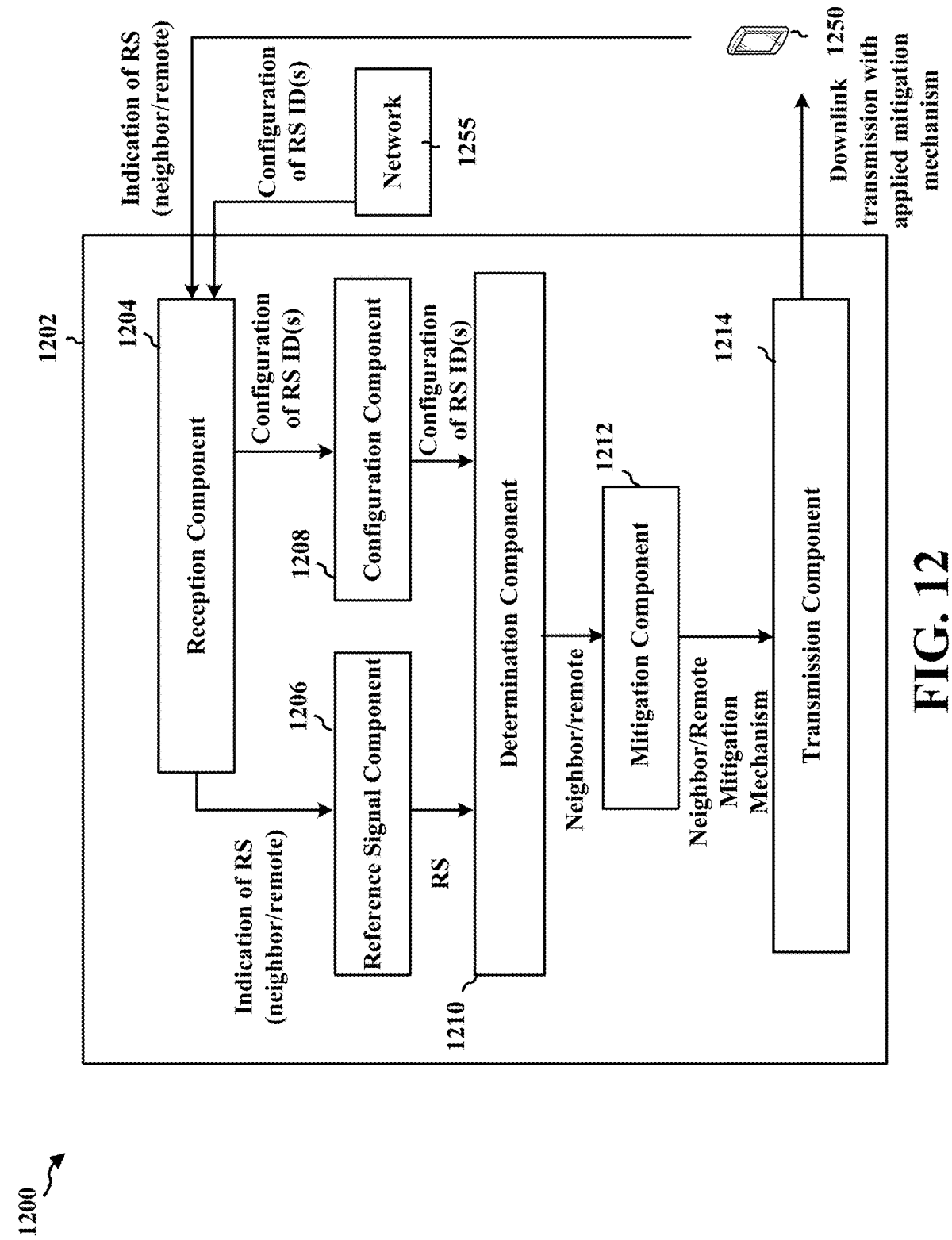
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station (e.g. the first base station or aggressor base station). The apparatus includes a reception component 1204 that receives signals from a UE 1250 including an indication of a reference signal from a second base station (e.g. the victim base station). The apparatus includes a reference signal component 1206 that receives, via the reception component 1204, the indication of the reference signal from the second base station via the UE, e.g., as described in connection with 1104 of FIG. 11. The reference signal is based on a reference signal identifier associated with any combination of a frequency resource, a sequence resource, a slot number, or a scrambling code. The apparatus includes a configuration component 1208 that receives, via the reception component 1204, configuration information regarding reference signal identifiers from a network 1255 (e.g. the AMF, OAM, or the second base station), e.g., as described in connection with 1102. The apparatus includes a determination component 1210 that determines whether the second base station is the remote base station or the neighbor base station based on the indication from the reference signal component 1206 and the configuration from the configuration component 1208, e.g., as described in connection with 1106. The apparatus includes a mitigation component 1212 that applies a mitigation mechanism based on the determination from the determination component 1210, e.g., as described in connection with 1108 of FIG. 11. The apparatus also includes a transmission component 1214 that transmits signals to the UE 1250 based, at least in part, on the applied mitigation mechanism by the mitigation component 1212 and determined from the determination component 1210.

The apparatus may include additional components that perform each of the blocks of the algorithm in the aforementioned flowchart of FIG. 11. As such, each block in the aforementioned flowchart of FIG. 11 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
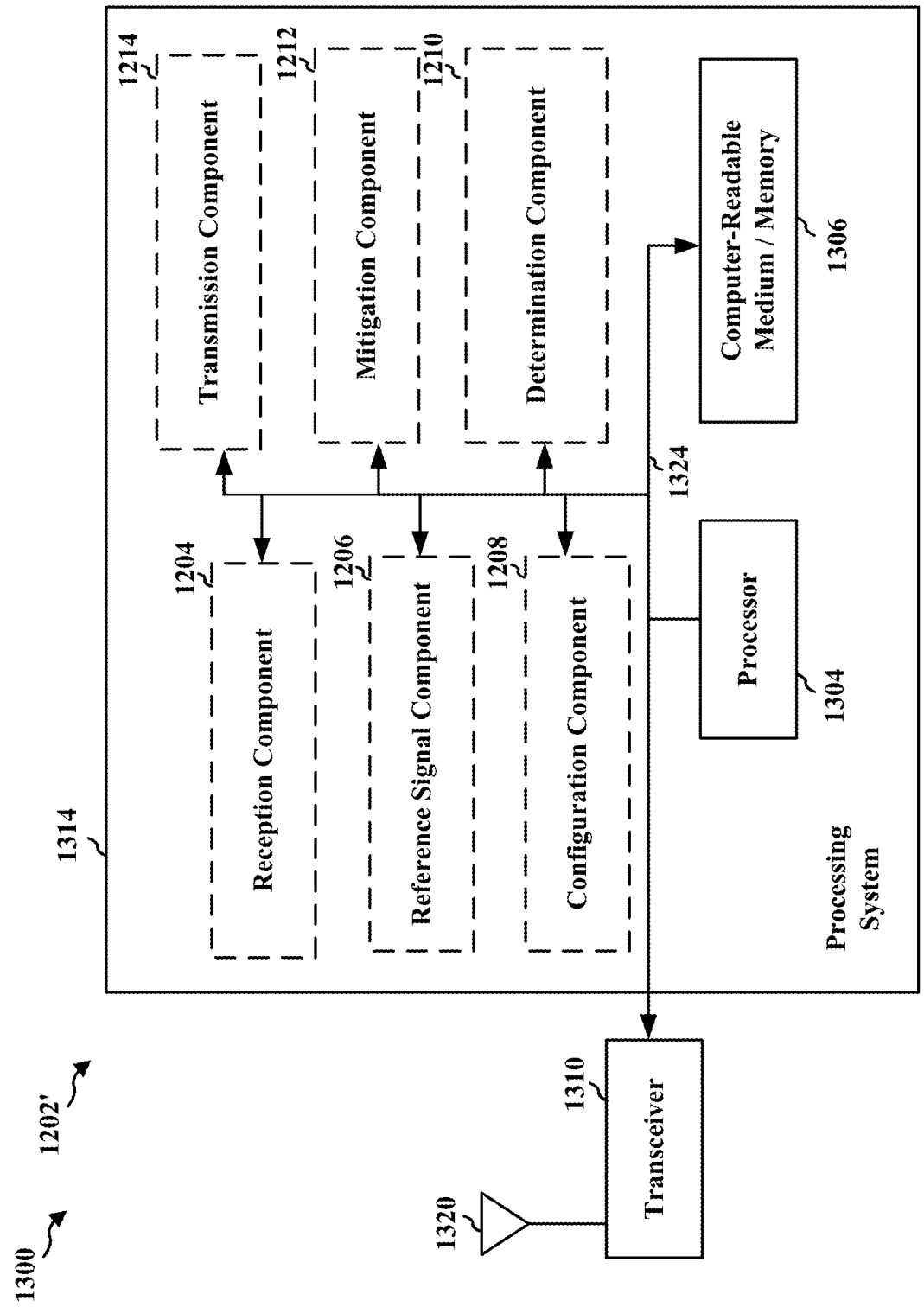
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1214, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer-readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for receiving, from a UE served by the first base station, an indication of a reference signal from a second base station, the reference signal being based on a reference signal identifier that indicates a location of the second base station that is experiencing interference from the first base station. The apparatus also includes means for applying a mitigation mechanism based on whether the reference signal identifier indicates that the second base station is a remote base station or a neighbor base station.

In one configuration, the indication from the UE may indicate whether the second base station is the remote base station or the neighbor base station. The apparatus may include means for determining whether the second base station that is experiencing the interference from the first base station is the remote base station or the neighbor base station based on the reference signal identifier. The first base station may apply a remote cell cross link interference mechanism when the reference signal identifier indicates that the second base station is the remote base station. The first base station may apply a neighbor cell cross link interference mitigation mechanism when the reference signal identifier indicates that the second base station is the neighbor base station. The remote cell cross link interference mechanism may include at least one of muting at least one symbol at an end of a downlink transmission period, performing partial muting at a subset of frequencies, applying power control to at least one symbol at the end of the downlink transmission period, or changing a transmission antenna parameter. The neighbor cell cross link interference mitigation mechanism may include at least one of muting at least one symbol at an end of a downlink transmission period; moving at least one symbol forward in an uplink transmission period, or requesting a downlink/uplink configuration from the second base station for use at the first base station.

In one configuration, the apparatus may include means for receiving configuration information regarding the reference signal identifier from a network, wherein the configuration information includes resources indicating the location of the second base station. The configuration information may indicate one of a sequence that identifies the location of the second base station, a frequency resource that identifies the location of the second base station, a time resource that identifies the location of the second base station, or a scrambling code that identifies the location of the second base station.

In one configuration, the reference signal may be received in a set of symbols at a time position configured by a network. In one configuration, the reference signal identifier may be based on any combination of a frequency resource, a sequence resource, a slot number, or a scrambling code for receiving the reference signal. In one configuration, the reference signal identifier may be cell specific. In one configuration, the reference signal identifier may be unique within a cluster of cells, and the reference signal identifier may include a cluster identifier and a cell identifier for the second base station.

In one configuration, the second base station may be the remote base station when the second base station is a distance greater than 100 kilometers away from the first base station. In one configuration, the second base station may be the remote base station when the reference signal identifier is not in a list of neighbor base station reference signal identifiers.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
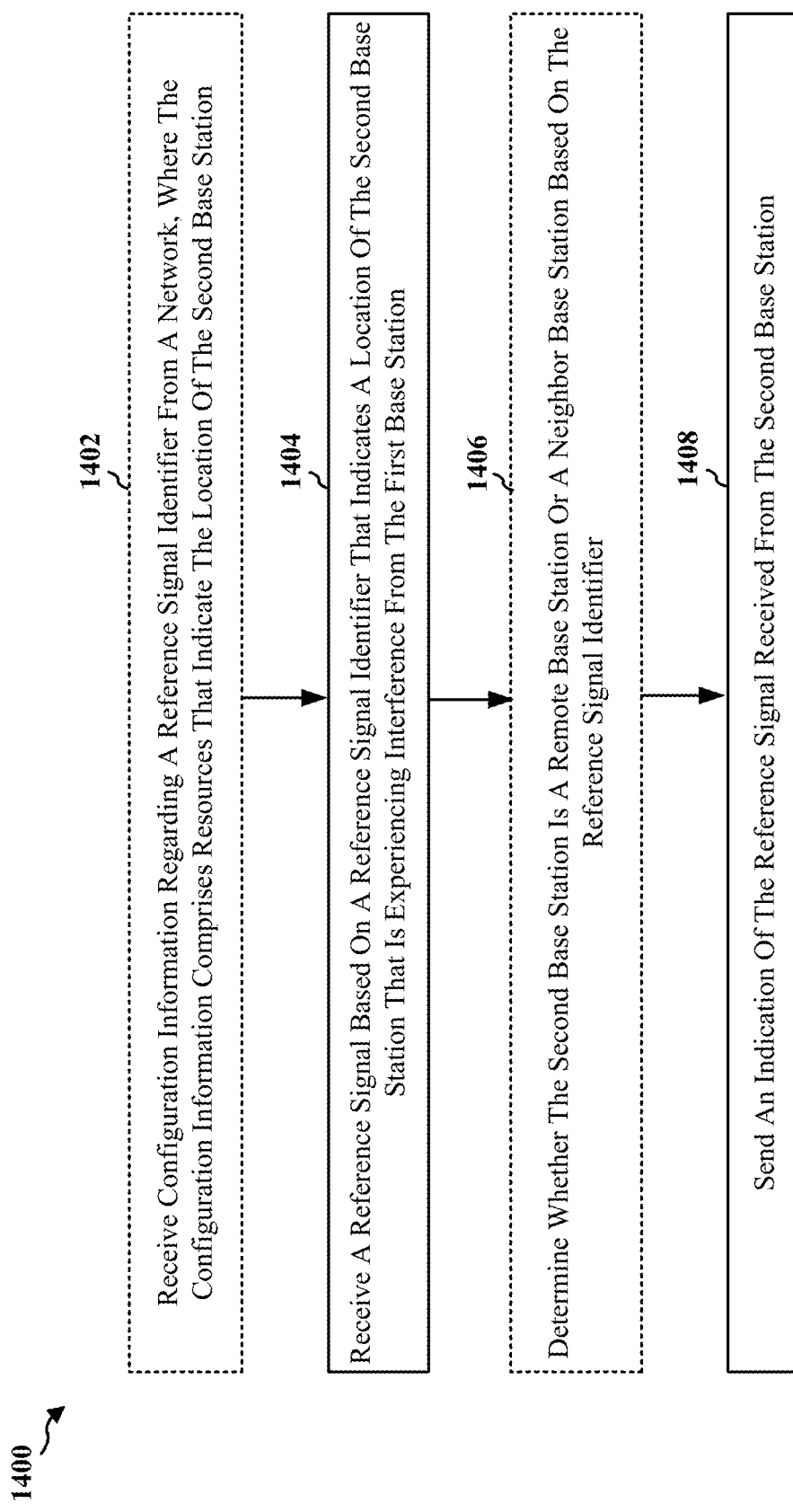
FIG. 14 is a flowchart of a method of wireless communication at a UE.

FIG. 14 is a flowchart 1400 of a method of wireless communication. The method may be performed by a UE (e.g., the UE 104, 350, 806, 810, 1006, 1010, 1250, the apparatus 1502/1502', the processing system 1614, which may include the memory 360 and which may be the entire UE 350 or a component of the UE 350, such as the TX processor 368, the RX processor 356, and/or the controller/processor 359). The UE may be, e.g., a UE served by a first base station (e.g., 102/180, 310, 808, 812, 1008, 1012, 1550, the apparatus 1202/1202') (e.g. an aggressor base station or an interfering base station). Optional aspects may be illustrated in dashed lines. The method allows a UE to distinguish between different types of interference, such as remote interference, CLI, or both to a second base station (e.g. a victim base station which may be a neighbor or remote base station), so that the first base station may apply different mitigations of the interference based on the type of interference. The first base station may also be able to make the determination based on information from the UE.

At 1402, the UE receives configuration information regarding a reference signal identifier from a network. For example, 1402 may be performed by the configuration component 1508 in the apparatus 1502 in FIG. 15. The configuration information may include resources that indicate the location of a second base station. In an aspect, the configuration information may indicate a sequence that identifies the location of the second base station. The configuration information may indicate a frequency resource that identifies the location of the second base station. The configuration information may indicate a time resource that identifies the location of the second base station. The configuration information may indicate a scrambling code that identifies the location of the second base station. For example, referring to FIG. 10, a network 1004 may provide configuration information 1051 to the UE 1006 served by the neighbor base station 1008, or the UE 1010 served by the remote base station 1012, regarding the RS ID which includes the resources indicating the location of the victim base station 1002. The resources may include a sequence, frequency resource, time resource, and/or scrambling code identifying the location of the victim base station 1002, e.g., as described in connection with 904 of FIG. 9.

At 1404, the UE receives, from a second base station (e.g., base station 102/180, 310, 802, 1002, 1551), a reference signal based on a reference signal identifier that indicates a location of the second base station that is experiencing interference from the first base station. For example, 1404 may be performed by the reference signal component 1506 of the apparatus 1502 in FIG. 15. In an aspect, the reference signal may be received in a set of symbols at a time position configured by the network. The reference signal identifier may be based on any combination of a frequency resource, a sequence resource, a slot number, or a scrambling code. For example, referring to FIG. 10, the UE 1006 and/or UE 1010 may receive and detect the reference signal 1050 from the victim base station 1002, as described in connection with 906 of FIG. 9. The reference signal includes an RS ID that indicates the location of the victim base station, e.g., as described in connection with 902 and 904 of FIG. 9.

For example, referring to FIG. 9, at 904, the UE may receive from the victim base station (BS1) an RS carrying an RS ID differentiated by frequency, sequence, slot number and/or scrambling code. In one example, the RS ID may identify a location of the victim base station using the time domain. For example, the victim base station may be configured to transmit the RS in a particular slot. The time position for the RS may be configured (e.g. by the network) and known by the aggressor base station and the victim base station. A slot number may carry the RS ID, e.g., a victim base station may be configured to use a particular slot number to transmit the RS when interference is detected. In another example, the RS ID may be indicated using a frequency domain. An available frequency band may be divided into sub-bands. The victim base station may be configured to use a particular sub-band to transmit the RS when cross-link interference is detected. Thus, different sub-bands may be used to carry RS IDs for different victim base stations. In another example, a sequence may be used to carry the RS ID. For example, a gold sequence, Zadoff Chu sequence or other sequence with good cross-correlation properties may be used to indicate the location of the victim base station sending the RS. Accordingly, when several different sequences, e.g., 8 sequences or another number, are used to carry the RS ID, the sequence of a particular RS may identify the RS and thus provide a form of RS ID. In another example, a scrambling code may be used to provide RS ID. The victim base station may be configured (e.g. by the network) to use a particular scrambling code for the RS that is transmitted when cross-link interference is detected.

The reference signal identifier may be cell specific. The reference signal identifier may be unique within a cluster of cells. The reference signal identifier may include a cluster identifier and a cell identifier for the second base station. For example, referring to FIG. 9, at 904, the RS ID may be cell specific, e.g., each cell has a corresponding RS ID. In another example, multiple cells may be arranged in a cluster, and the RS ID may be reused per cluster such that there are no conflicts within a cluster (e.g. the cluster is large enough so that no conflicting RS IDs may be expected). The RS ID may also include two parts, e.g., a cluster ID and a cell ID. In one example, the cluster ID may be unique. In another example, the cluster ID may be reused for clusters with a large geometry. When the cluster ID is reused, it may generally be reused over a large area such that the distance between two groups of cells having the same cluster ID may be large, e.g., greater than the distance of the potential atmospheric ducting.

At 1406, the UE determines whether the second base station is a remote base station or a neighbor base station based on the reference signal identifier. For example, 1406 may be performed by the determination component 1510 of the apparatus 1502 in FIG. 15. The second base station may be the remote base station when the second base station is a distance greater than 100 kilometers away from the first base station. The second base station may be the remote base station when the reference signal identifier is not in a list of neighbor base station reference signal identifiers. For example, referring to FIG. 10, when the UE 1006 and/or UE 1010 detects the RS, as described in connection with 906 of FIG. 9, the UE(s) may determine if the inference is caused by a neighbor base station 1008 or a remote base station 1012 at block(s) 1056. The UE may determine if the interference is remote interference or neighbor interference using the RS ID. For example, the UE may consult a look up table to determine a distance to the victim base station based on the sequence, frequency, slot number, and/or scrambling code used to transmit the RS. As another example, the UE may check a list of RS IDs corresponding to neighboring base stations and determine that the victim is a remote base station if it is not in the list.

At 1408, the UE sends, to the first base station, an indication of the reference signal received from the second base station. For example, 1408 may be performed by the indication component 1512 of the apparatus 1502 in FIG. 15. The indication to the first base station may indicate whether the second base station is the remote base station or the neighbor base station. Alternately, the UE may report the reference signal without indicating whether the second base station is a neighbor or remote. For example, referring to FIG. 10, when the UE 1006 and/or UE 1010 detects the RS, as described in connection with 906 of FIG. 9, the UE(s) may determine if the inference is caused by a neighbor base station 1008 or a remote base station 1012 at block(s) 1056 and send an indication 1058 to its corresponding base station, e.g., neighbor base station 1008 and/or remote base station 1012, if the interference is neighbor interference or remote interference as described in connection with 908 of FIG. 9. Alternately, the UE 1006/1010 may merely report the RS to the corresponding serving base station without making a determination about whether the RS is from a neighbor base station or a remote base station.

Figure 15:
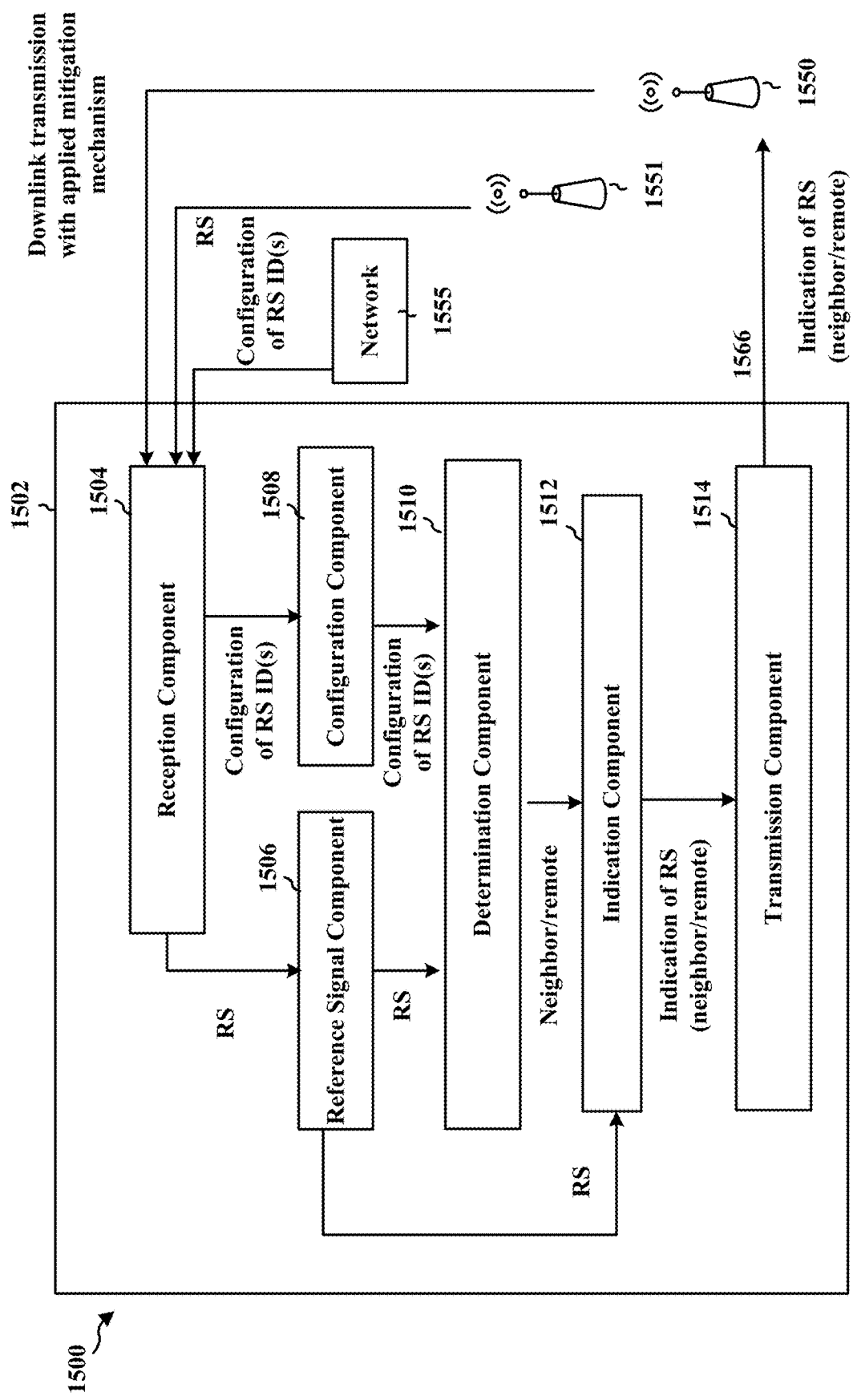
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a UE. The apparatus includes a reception component 1504 that receives signals from base stations (e.g. first base station 1550 (aggressor) and second base station 1551 (victim)), including downlink transmissions from the first base station 1550 and a reference signal from the second base station 1551. The apparatus includes a reference signal component 1506 that receives a reference signal, via the reception component 1504, from the second (victim) base station 1551, e.g., as described in connection with 1404 of FIG. 14. The apparatus includes a configuration component 1508 that receives configuration information, via the reception component 1504, from a network 1555 (e.g. an AMF, OAM, or the second base station 1551), e.g., as described in connection with 1402 of FIG. 14. The apparatus includes a determination component 1510 that determines whether the second base station 1551 is a remote base station or a neighbor base station based on the reference signal from the reference signal component 1506 and/or the configuration information from the configuration component 1508, e.g., as described in connection with 1406 of FIG. 14. The apparatus includes an indication component 1512 that sends, via a transmission component 1514, an indication of the reference signal to the first base station 1550 based on the reference signal from the reference signal component 1506 and/or the determination from the determination component 1510. The apparatus includes the transmission component 1514 that transmits signals to the base station 1550 from the indication component 1512, including an indication that a reference signal was received from the second base station 1551, e.g., as described in connection with 1408 of FIG. 14.

The apparatus may include additional components that perform each of the blocks of the algorithm in the aforementioned flowchart of FIG. 14. As such, each block in the aforementioned flowchart of FIG. 14 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
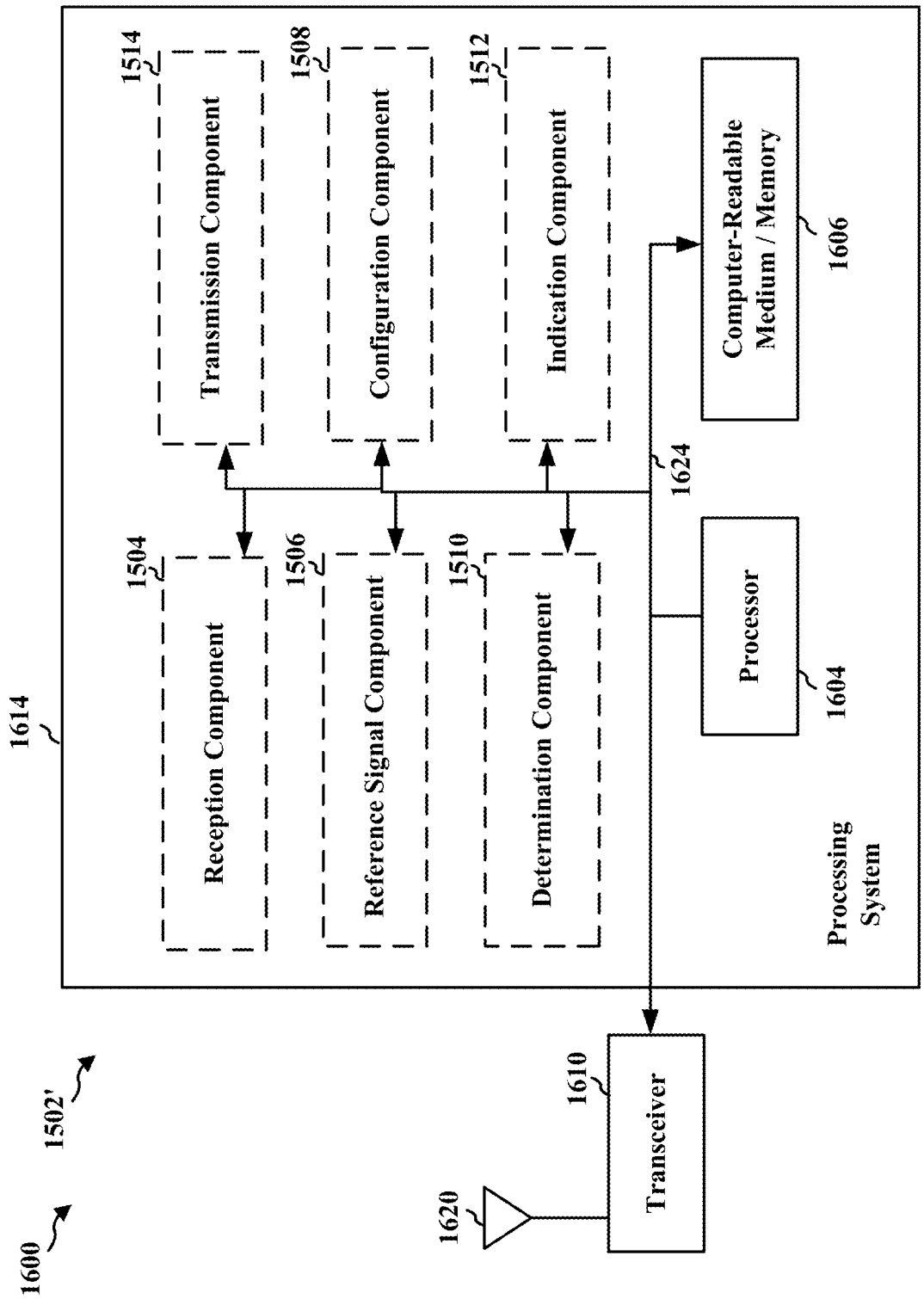
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514 and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1514, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514. The components may be software components running in the processor 1604, resident/stored in the computer-readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359. Alternatively, the processing system 1614 may be the entire UE (e.g., see 350 of FIG. 3).

In one configuration, the apparatus 1502/1502' for wireless communication includes means for receiving, from a second base station, a reference signal based on a reference signal identifier that indicates a location of the second base station that is experiencing interference from the first base station. The apparatus also includes means for sending, to the first base station, an indication of the reference signal received from the second base station.

In one configuration, the apparatus may include means for determining whether the second base station is a remote base station or a neighbor base station based on the reference signal identifier, wherein the indication to the first base station indicates whether the second base station is the remote base station or the neighbor base station. The second base station may be the remote base station when the second base station is a distance greater than 100 kilometers away from the first base station. The second base station may also be the remote base station when the reference signal identifier is not in a list of neighbor base station reference signal identifiers.

In one configuration, the apparatus may include means for receiving configuration information regarding the reference signal identifier from a network, wherein the configuration information includes resources that indicate the location of the second base station. The configuration information may indicate one of a sequence that identifies the location of the second base station, a frequency resource that identifies the location of the second base station, a time resource that identifies the location of the second base station, or a scrambling code that identifies the location of the second base station.

In one configuration, the reference signal may be received in a set of symbols at a time position configured by the network. In one configuration, the reference signal identifier may be based on any combination of a frequency resource, a sequence resource, a slot number, or a scrambling code. In one configuration, the reference signal identifier may be cell specific. In one configuration, the reference signal identifier may be unique within a cluster of cells, and the reference signal identifier may include a cluster identifier and a cell identifier for the second base station.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication at a first base station, comprising: receiving, from a UE served by the first base station, an indication of a reference signal from a second base station, the reference signal being based on a reference signal identifier that indicates a location of the second base station that is experiencing interference from the first base station; and applying a mitigation mechanism based on whether the reference signal identifier indicates that the second base station is a remote base station or a neighbor base station.

In Example 2, the method of Example 1 further includes that the indication from the UE indicates whether the second base station is the remote base station or the neighbor base station.

In Example 3, the method of Example 1 or 2 further includes determining whether the second base station that is experiencing the interference from the first base station is the remote base station or the neighbor base station based on the reference signal identifier, wherein the first base station applies a remote cell cross link interference mechanism when the reference signal identifier indicates that the second base station is the remote base station, and wherein the first base station applies a neighbor cell cross link interference mitigation mechanism when the reference signal identifier indicates that the second base station is the neighbor base station.

In Example 4, the method of any of Example 1-3 further includes that the remote cell cross link interference mechanism comprises at least one of muting at least one symbol at an end of a downlink transmission period, performing partial muting at a subset of frequencies, applying power control to at least one symbol at the end of the downlink transmission period, or changing a transmission antenna parameter.

In Example 5, the method of any of Example 1-4 further includes that the neighbor cell cross link interference mitigation mechanism comprises at least one of muting at least one symbol at an end of a downlink transmission period; moving at least one symbol forward in an uplink transmission period, or requesting a downlink/uplink configuration from the second base station for use at the first base station.

In Example 6, the method of any of Example 1-5 further includes receiving configuration information regarding the reference signal identifier from a network, wherein the configuration information comprises resources indicating the location of the second base station.

In Example 7, the method of any of Example 1-6 further includes that the configuration information indicates a sequence that identifies the location of the second base station.

In Example 8, the method of any of Example 1-7 further includes that the configuration information indicates a frequency resource that identifies the location of the second base station.

In Example 9, the method of any of Example 1-8 further includes that the configuration information indicates a time resource that identifies the location of the second base station.

In Example 10, the method of any of Example 1-9 further includes that the reference signal is received in a set of symbols at a time position configured by a network.

In Example 11, the method of any of Example 1-10 further includes that the configuration information indicates a scrambling code that identifies the location of the second base station.

In Example 12, the method of any of Example 1-11 further includes that the reference signal identifier is based on any combination of a frequency resource, a sequence resource, a slot number, or a scrambling code for receiving the reference signal.

In Example 13, the method of any of Example 1-12 further includes that the reference signal identifier is cell specific.

In Example 14, the method of any of Example 1-13 further includes that the reference signal identifier is unique within a cluster of cells.

In Example 15, the method of any of Example 1-14 further includes that the reference signal identifier comprises a cluster identifier and a cell identifier for the second base station.

Example 16 is a device including one or more processors and one or more memories in electronic communication with the one or more processors storing instructions executable by the one or more processors to cause the system or apparatus to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

Example 19 is a method of wireless communication at a UE served by a first base station, comprising: receiving, from a second base station, a reference signal based on a reference signal identifier that indicates a location of the second base station that is experiencing interference from the first base station; and sending, to the first base station, an indication of the reference signal received from the second base station.

In Example 20, the method of Example 19 further includes determining whether the second base station is a remote base station or a neighbor base station based on the reference signal identifier, wherein the indication to the first base station indicates whether the second base station is the remote base station or the neighbor base station.

In Example 21, the method of Example 19 or Example 20 further includes receiving configuration information regarding the reference signal identifier from a network, wherein the configuration information comprises resources that indicate the location of the second base station.

In Example 22, the method of any of Examples 19-21 further includes that the configuration information indicates a sequence that identifies the location of the second base station.

In Example 23, the method of any of Examples 19-22 further includes that the configuration information indicates a frequency resource that identifies the location of the second base station.

In Example 24, the method of any of Examples 19-23 further includes that the configuration information indicates a time resource that identifies the location of the second base station.

In Example 25, the method of any of Examples 19-24 further includes that the reference signal is received in a set of symbols at a time position configured by the network.

In Example 26, the method of any of Examples 19-25 further includes that the configuration information indicates a scrambling code that identifies the location of the second base station.

In Example 27, the method of any of Examples 19-26 further includes that the reference signal identifier is based on any combination of a frequency resource, a sequence resource, a slot number, or a scrambling code.

In Example 28, the method of any of Examples 19-27 further includes that the reference signal identifier is cell specific.

In Example 29, the method of any of Examples 19-28 further includes that the reference signal identifier is unique within a cluster of cells.

In Example 30, the method of any of Examples 19-29 further includes that the reference signal identifier comprises a cluster identifier and a cell identifier for the second base station.

Example 31 is a device including one or more processors and one or more memories in electronic communication with the one or more processors storing instructions executable by the one or more processors to cause the system or apparatus to implement a method as in any of Examples 19-30.

Example 32 is a system or apparatus including means for implementing a method or realizing an apparatus as in any of Examples 19-30.

Example 33 is a non-transitory computer readable medium storing instructions executable by one or more processors to cause the one or more processors to implement a method as in any of Examples 19-30.

In an Example 34, for all of Examples 1-33, a base station such as a second base station may be a remote base station when the base station, e.g., second base station, is a distance greater than 100 kilometers away from the first base station and/or when the reference signal identifier is not in a list of neighbor base station reference signal identifiers.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first base station, comprising:
   receiving, from a User Equipment (UE) served by the first base station, an indication of a reference signal from a second base station, the reference signal being based on a reference signal identifier that indicates a location of the second base station that is experiencing interference from the first base station; and
   applying a mitigation mechanism based on whether the reference signal identifier indicates that the second base station is a remote base station or a neighbor base station.

2. The method of claim 1, wherein the indication from the UE indicates whether the second base station is the remote base station or the neighbor base station.

3. The method of claim 1, further comprising:
   determining whether the second base station that is experiencing the interference from the first base station is the remote base station or the neighbor base station based on the reference signal identifier,
   wherein the first base station applies a remote cell cross link interference mechanism when the reference signal identifier indicates that the second base station is the remote base station, and
   wherein the first base station applies a neighbor cell cross link interference mitigation mechanism when the reference signal identifier indicates that the second base station is the neighbor base station.

4. The method of claim 3, wherein the remote cell cross link interference mechanism comprises at least one of muting at least one symbol at an end of a downlink transmission period, performing partial muting at a subset of frequencies, applying power control to at least one symbol at the end of the downlink transmission period, or changing a transmission antenna parameter.

5. The method of claim 3, wherein the neighbor cell cross link interference mitigation mechanism comprises at least one of muting at least one symbol at an end of a downlink transmission period; moving at least one symbol forward in an uplink transmission period, or requesting a downlink/uplink configuration from the second base station for use at the first base station.

6. The method of claim 1, further comprising:
   receiving configuration information regarding the reference signal identifier from a network, wherein the configuration information comprises resources indicating the location of the second base station, and wherein the configuration information indicates one of:
   a sequence that identifies the location of the second base station,
   a frequency resource that identifies the location of the second base station,
   a time resource that identifies the location of the second base station, or
   a scrambling code that identifies the location of the second base station.

7. The method of claim 6, wherein the reference signal is received in a set of symbols at a time position configured by the network.

8. The method of claim 1, wherein the reference signal identifier is based on any combination of a frequency resource, a sequence resource, a slot number, or a scrambling code for receiving the reference signal.

9. The method of claim 1, wherein the reference signal identifier is cell specific.

10. The method of claim 1, wherein the reference signal identifier is unique within a cluster of cells, and wherein the reference signal identifier comprises a cluster identifier and a cell identifier for the second base station.

11. The method of claim 1, wherein the second base station is the remote base station when the second base station is a distance greater than 100 kilometers away from the first base station.

12. The method of claim 1, wherein the second base station is the remote base station when the reference signal identifier is not in a list of neighbor base station reference signal identifiers.

13. An apparatus for wireless communication at a first base station, comprising:
a memory; and
at least one processor coupled to the memory and configured to:
receive, from a User Equipment (UE) served by the first base station, an indication of a reference signal from a second base station, the reference signal being based on a reference signal identifier that indicates a location of the second base station that is experiencing interference from the first base station; and
apply a mitigation mechanism based on whether the reference signal identifier indicates that the second base station is a remote base station or a neighbor base station.

14. The apparatus of claim 13,
wherein the at least one processor is further configured to determine whether the second base station that is experiencing the interference from the first base station is the remote base station or the neighbor base station based on the reference signal identifier,
wherein the at least one processor is further configured to apply a remote cell cross link interference mechanism when the reference signal identifier indicates that the second base station is the remote base station, and
wherein the at least one processor is further configured to apply a neighbor cell cross link interference mitigation mechanism when the reference signal identifier indicates that the second base station is the neighbor base station.

15. The apparatus of claim 14, wherein the remote cell cross link interference mechanism comprises the at least one processor being configured to at least one of mute at least one symbol at an end of a downlink transmission period, perform partial muting at a subset of frequencies, apply power control to at least one symbol at the end of the downlink transmission period, or change a transmission antenna parameter.

16. The apparatus of claim 14, wherein the neighbor cell cross link interference mitigation mechanism comprises the at least one processor being configured to at least one of mute at least one symbol at an end of a downlink transmission period; move at least one symbol forward in an uplink transmission period, or request a downlink/uplink configuration from the second base station for use at the first base station.

17. The apparatus of claim 13, wherein the at least one processor is further configured to:
receive configuration information regarding the reference signal identifier from a network, wherein the configuration information comprises resources indicating the location of the second base station, and wherein the configuration information indicates one of:
a sequence that identifies the location of the second base station,
a frequency resource that identifies the location of the second base station,
a time resource that identifies the location of the second base station, or
a scrambling code that identifies the location of the second base station.

18. A method of wireless communication at a User Equipment (UE) served by a first base station, comprising:
receiving, from a second base station, a reference signal based on a reference signal identifier that indicates a location of the second base station that is experiencing interference from the first base station; and
sending, to the first base station, an indication of the reference signal received from the second base station.

19. The method of claim 18, further comprising:
determining whether the second base station is a remote base station or a neighbor base station based on the reference signal identifier, wherein the indication to the first base station indicates whether the second base station is the remote base station or the neighbor base station.

20. The method of claim 19, wherein the second base station is the remote base station when the second base station is a distance greater than 100 kilometers away from the first base station.

21. The method of claim 19, wherein the second base station is the remote base station when the reference signal identifier is not in a list of neighbor base station reference signal identifiers.

22. The method of claim 18, further comprising:
receiving configuration information regarding the reference signal identifier from a network, wherein the configuration information comprises resources that indicate the location of the second base station, and wherein the configuration information indicates one of:
a sequence that identifies the location of the second base station,
a frequency resource that identifies the location of the second base station,
a time resource that identifies the location of the second base station, or
a scrambling code that identifies the location of the second base station.

23. The method of claim 22, wherein the reference signal is received in a set of symbols at a time position configured by the network.

24. The method of claim 18, wherein the reference signal identifier is based on any combination of a frequency resource, a sequence resource, a slot number, or a scrambling code.

25. The method of claim 18, wherein the reference signal identifier is cell specific.

26. The method of claim 18, wherein the reference signal identifier is unique within a cluster of cells, and wherein the reference signal identifier comprises a cluster identifier and a cell identifier for the second base station.

27. An apparatus for wireless communication at a User Equipment (UE) served by a first base station, comprising:
a memory; and
at least one processor coupled to the memory and configured to:
receive, from a second base station, a reference signal based on a reference signal identifier that indicates a location of the second base station that is experiencing interference from the first base station; and
send, to the first base station, an indication of the reference signal received from the second base station.

28. The apparatus of claim 27, wherein the at least one processor is further configured to:

determine whether the second base station is a remote base station or a neighbor base station based on the reference signal identifier, wherein the indication to the first base station indicates whether the second base station is the remote base station or the neighbor base station.

29. The apparatus of claim 27, wherein the at least one processor is further configured to:
receive configuration information regarding the reference signal identifier from a network, wherein the configuration information comprises resources that indicate the location of the second base station, and wherein the configuration information indicates one of:
a sequence that identifies the location of the second base station,
a frequency resource that identifies the location of the second base station,
a time resource that identifies the location of the second base station, or
a scrambling code that identifies the location of the second base station.

30. The apparatus of claim 29, wherein the reference signal is received in a set of symbols at a time position configured by the network.

31. The method of claim 1, further comprising:
determining whether to apply a neighbor cell cross link interference mitigation mechanism or a remote cell cross link interference mechanism based on whether the second base station is the neighbor base station or the remote base station that is interfered based on atmospheric ducting.

32. The method of claim 1, wherein applying the mitigation mechanism based on whether the reference signal identifier indicates that the second base station is the remote base station or the neighbor base station includes:
applying a cell cross link interference mitigation mechanism when the second base station is the neighbor base station; and
applying a remote cell cross link interference mechanism when the remote base station that is interfered based on atmospheric ducting.

* * * * *